US008694698B2

(12) United States Patent  
Mizuno et al.

(10) Patent No.: US 8,694,698 B2  
(45) Date of Patent: Apr. 8, 2014

(54) STORAGE SYSTEM AND METHOD FOR PRIORITIZING DATA TRANSFER ACCESS

(75) Inventors: Makio Mizuno, Sagamihara (JP);  
Masanori Takada, Yokohama (JP);  
Tomohiro Yoshihara, Yokohama (JP);  
Susumu Tsuruta, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/503,489

(22) PCT Filed: Apr. 12, 2012

(86) PCT No.: PCT/JP2012/002530  
§ 371 (c)(1),  
(2), (4) Date: Apr. 23, 2012

(87) PCT Pub. No.: WO2013/153577  
PCT Pub. Date: Oct. 17, 2013

(65) Prior Publication Data  
US 2013/0275630 A1 Oct. 17, 2013

(51) Int. Cl.  
*G06F 13/00* (2006.01)  
*G06F 3/00* (2006.01)

(52) U.S. Cl.  
USPC ............................................. 710/33; 710/40

(58) Field of Classification Search  
None  
See application file for complete search history.

(56) References Cited

U.S. PATENT DOCUMENTS

| 6,393,519 | B1 | 5/2002 | Fujimoto et al. |
| 8,271,749 | B2 * | 9/2012 | Yamaguchi et al. .......... 711/158 |
| 2003/0056034 | A1 | 3/2003 | Olds et al. |
| 2006/0095686 | A1 | 5/2006 | Miller et al. |

FOREIGN PATENT DOCUMENTS

JP 2000-010901 A 1/2000

OTHER PUBLICATIONS

PCT International Search Report and Written Opinion on application PCT/JP/2012/002530 mailed Aug. 23, 2012; 10 pages.

* cited by examiner

*Primary Examiner* — Idriss N Alrobaye  
*Assistant Examiner* — Richard B Franklin  
(74) *Attorney, Agent, or Firm* — Foley & Lardner LLP

(57) ABSTRACT

According to a prior art data transfer method of a storage subsystem, when competition of data transfer accesses occurs, a free access destination port is allocated uniformly without determining the access type or the access state of the access destination, so that the performance of the device is not enhanced. The present invention solves the problem by selecting a data transfer access for completing data transfer with priority based on the access type or the remaining transfer data quantity of competing data transfer accesses, or by changing the access destination of an access standby data transfer access, thereby performing data transfer efficiently.

18 Claims, 30 Drawing Sheets

Fig.9

| Transfer Length | Transmitting Packet Count |
|---|---|
| 512 | 1 |
| 8192 | 16 |
| 65536 | 128 |

| Request Type | Threshold |
|---|---|
| Sync | 16 |
| Async(restriction) | 2 |
| Async | 0 |

| DMA# | Request Type | Threshold |
|---|---|---|
| 0 | Sync | 16 |
| 1 | Async | 0 |
| 2 | Sync | 20 |
| 3 | Async | 2 |
| 4 | Async | 16 |

| Request Type | Length | Threshold |
|---|---|---|
| Sync | Long | 16 |
| Sync | Short | 2 |
| Async | - | 0 |

STORAGE SYSTEM AND METHOD FOR PRIORITIZING DATA TRANSFER ACCESS

TECHNICAL FIELD

The present invention relates to a data transfer method in a storage system comprising a host computer and a storage subsystem.

BACKGROUND ART

Recently, there are increasing demands for further improvement of the processing performance of storage systems along with the enhancement of processing performance of processors and the advancement of data transfer technology. In order to improve the processing performance of the storage system, it is necessary to adopt the latest components and technology, enhance processors and other components, and improve the processing efficiency of data transfer that occurs within the storage system.

On the other hand, in order to follow the reduction of costs progressing in the whole storage system market, approaches are made to adopt the latest components and technology and the enhancement of components, but such approaches for enhancing the processing performance lead to increased costs, so that it is difficult to correspond to market trends. In order to realize both low costs and enhanced processing performance of storage systems, it is effective to improve the processing efficiency of data transfer.

Patent Literature 1 discloses an art for enhancing the processing efficiency of data transfer in a storage system. This patent literature teaches efficient use of channel access paths among channel I/F units, disk I/F units and shared memory units or cache memory units, thereby improving the memory access throughput, especially the access throughput to the cache memory.

CITATION LIST

Patent Literature

PTL 1: Japanese Patent Application Laid-Open Publication No. 2000-10901 (U.S. Pat. No. 6,393,519)

SUMMARY OF INVENTION

Technical Problem

Patent literature 1 discloses a disk array controller capable of having a high memory access throughput. Actually, the disk array controller is provided which comprises one or more interface units to a host computer, one or more interface units to a plurality of disk drives, and one or more physically independent shared memory units for storing control information on data in the disk drives and on the disk array controller, wherein the interface units to the host computer and the interface units to the disk drives can access the shared memory units via a selector, and access paths are connected between the selector and the interface units to the host computer and to the disk drives and between the selector and the shared memory units.

The selector unit of the disk array controller includes a unit for connecting a plurality of input ports from the interface units to the host computer and to the disk drives to a plurality of output ports to the shared memory units, a unit for storing connection requests from input ports to output ports in an arrival order of the connection requests, and an arbiter unit for arbitrating a plurality of connection requests and assigning an output port to a connection request from an input port.

Further, the arbiter unit assigns, if a first connection request among the connection requests stored in the arrival order is a connection request to a vacant output port, the output port to the connection request, checks a second connection request, if the first connection request among the connection requests stored in the arrival order is a connection request to an occupied output port, and assigns, if the second connection request is a connection request to a vacant output port, the output port to the second connection request, checks a third connection request, if the second connection request is a connection request to an occupied output port, and thereafter repeats an arbitration (assignment) of an output port to a connection request at the most by several times equal to the number of vacant output ports.

Within the disk array controller, data transfer is largely classified into a data transfer that directly influences the device performance and a data transfer having no direct influence. However, according to the system for enhancing the memory access throughput according to patent literature 1, a vacant port is assigned uniformly regardless of whether the transfer influences the performance of the device or not. In other words, the request to a vacant port is assigned even if the request does not have direct influence on the performance of the device, so that the processing of a request having direct influence on the performance of the device is put on hold, according to which the performance of the device is deteriorated.

Solution to Problem

In order to solve the problems mentioned above, the present invention provides a storage subsystem coupled to a host computer, the storage subsystem comprising a disk device coupled to the host computer, capable of communicating with the host computer and storing data related to a write request from the host computer, and a storage controller for controlling the disk device, the storage controller comprising a memory unit for storing data communicated with the host computer and a control information of the storage controller, and a processor unit for controlling the storage controller, and when a first data transfer access to the memory unit competes with a second data transfer access, the first data transfer access is prioritized over the second data transfer access to complete a data transfer process when the first data transfer access satisfies one of the following conditions: the access which is a request synchronized with the host IO; or a remaining data transfer quantity is equal to or smaller than a predetermined threshold.

Further, the storage controller comprises a host interface unit for communicating with the host computer and a disk interface unit for communicating with the disk device. Even further, the access which is a request synchronized with the host IO is one of the following: a data write transfer for writing data from the host interface unit to the memory unit; a data read transfer for reading data from the memory unit to the host interface unit; and a data write transfer for writing the data stored in the disk device to the memory unit. Even further, if a third data transfer access executed after completing the first data transfer access is an access to a memory area that differs from the memory area of the first data transfer access, the third data transfer access to a memory area that differs from said memory area is started. Furthermore, when a data transfer quantity of the first data transfer access differs from a data transfer quantity of the second data transfer access, a data transfer access to be performed with priority is selected based on a remaining data transfer quantity.

Advantageous Effects of Invention

According to the present invention, it becomes possible to enhance the utilization ratio of a cache memory having low utilization ratio, and to improve the access performance and the processing performance of the whole storage subsystem and the computer system including the storage subsystem.

BRIEF DESCRIPTION OF DRAWINGS

FIG. 9 is an explanatory view of a transmitting packet count table according to the first embodiment of the present invention.

FIG. 13 is an explanatory view of a first modified example of the threshold table according to the first embodiment of the present invention.

FIG. 14 is an explanatory view of a second modified example of the threshold table according to the first embodiment of the present invention.

FIG. 15 is an explanatory view of a third modified example of the threshold table according to the first embodiment of the present invention.

DESCRIPTION OF EMBODIMENTS

Figure 1:
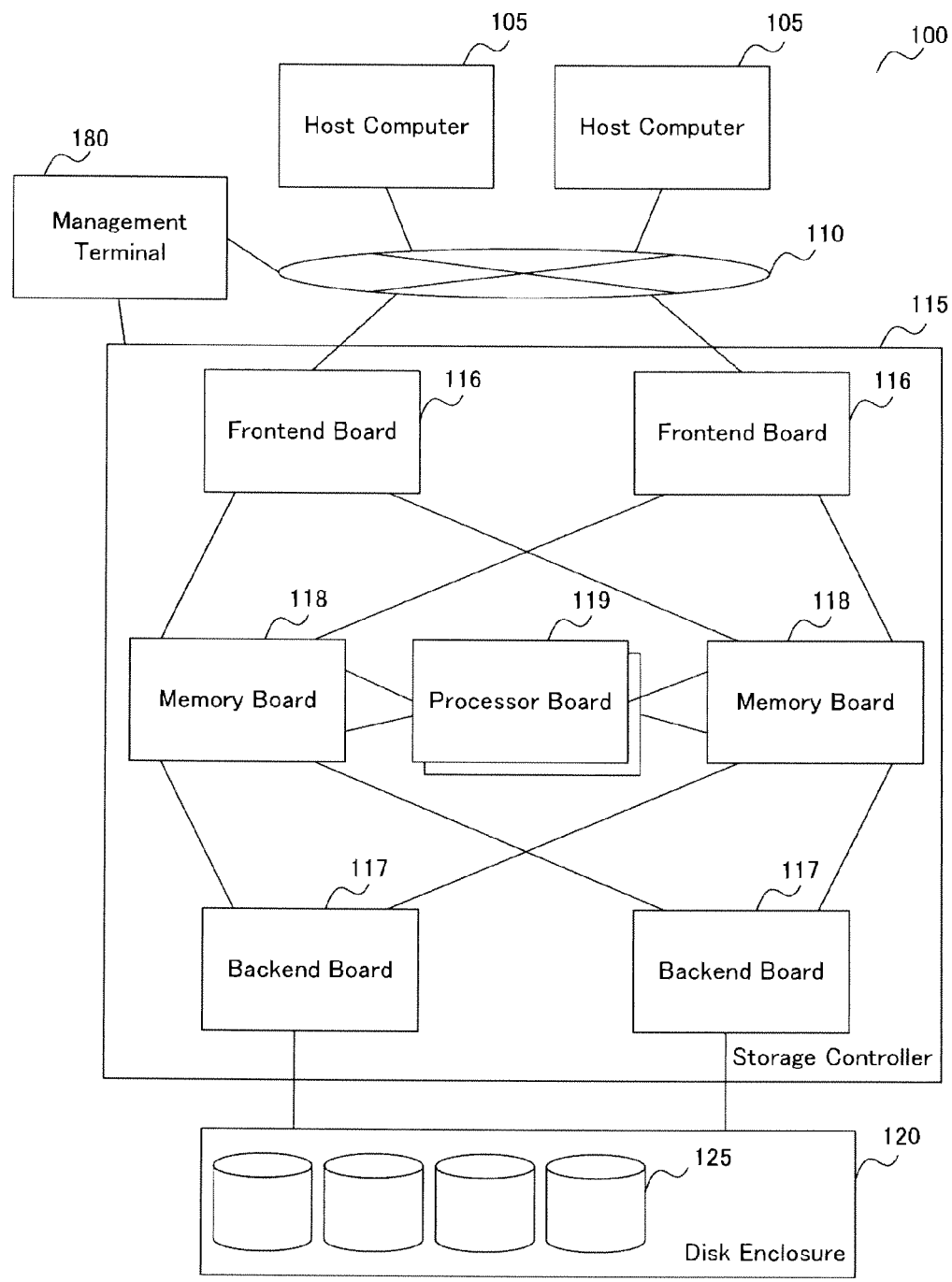
FIG. 1 is a block diagram showing a configuration of a computer system according to a first embodiment of the present invention.

Now, the preferred embodiments of the present invention will be described with reference to the drawings. In the following description, various information are referred to as "management table" and the like, but the various information can be expressed by data structures other than tables. Further, the "management table" can also be referred to as "management information" to show that the information does not depend on the data structure.

The processes are sometimes described using the term "program" as the subject. The program is executed by a processor such as a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or a storage media, for example.

Each element can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of each component can be one or more than one unless defined otherwise.

Embodiment 1

The present embodiment (embodiment 1) is a preferred embodiment of a method for improving the performance of a computer system 100 by enhancing the efficiency of memory access. Now, the details of the present embodiment will be described with reference to the drawings.

<System Configuration Example>

FIG. 1 is an example of a storage controller 115 to which the present invention is applied, and a computer system 100 including the storage controller 115. The computer system 100 includes a host computer 105 for performing data processing and computation, a storage controller 115, and a storage device 120 storing disks 125. There can be multiple host computers 105 and storage devices 120. The storage controller 115 and the storage device 120 as a set is called a storage system.

Generally, in a SAN (Storage Area Network), the host computer 105 and the storage controller 115 are coupled by a fiber channel or an Ethernet (Registered Trademark) and the like via a network 110 composed of a switch or the like not shown.

The host computer 105 sends a data write request or a data read request to the storage controller 115. When a read request is received from the host computer 105, the storage controller 115 reads the data related to the read request from the storage device 120 and sends the read data to the host computer 105. When a write request is received from the host computer 105, the storage controller 115 writes the data related to the write request to the storage device 120.

Multiple disks 125 are mounted to the storage device 120. The disk 125 can be a hard disk drive (HDD), a SSD (Solid State Drive) mounting a nonvolatile memory such as a flash memory, an optical disk, or a magneto optical disk. The disk 125 stores the data sent from the host computer 105. At this time, by performing data redundancy by the plurality of disks via RAID operation or the like, it becomes possible to prevent data loss when failure occurs to the disks.

The storage controller 115 is equipped with a frontend board 116, a backend board 117, a memory board 118 and a processor board 119.

The frontend board 116 is equipped with an interface coupled to the host computer 105. The frontend board 116 performs protocol processing to the packet received from the host computer 105. Actually, the frontend board 116 executes protocol processing to specify the storage location in the storage device 120 and the capacity from the received packet, the capacity of the received packet and the command included in the received packet, and converts the received packet to a form usable to the storage controller 115.

The frontend board 116 performs protocol processing to the packet which transmits to the host computer 105. Specifically, the frontend board 116 generates the packet for transmitting the read data to the host computer 105 based on the communications protocol between the storage controller 115 and the host computer 105.

The backend board 117 is equipped with an interface coupled to the storage device 120. The backend board 117 is equipped with the same function as the frontend board 116. Actually, the backend board 117 performs protocol processing to the packet received from the storage device 120. Further, the backend board 117 converts the packet to a form storable to the storage device 120.

The memory board 118 comprises a cache memory area for temporarily storing the data communicated with the host computer 105, and a system area for storing the control data, the configuration data, the directory data and the like of the storage system.

The processor board 119 controls various components within the storage controller 115 such as the frontend board 116 and the backend board 117. For example, it sets up a data transfer parameter of the frontend board 116 and the backend board 117. Further, the processor board 119 monitors failure of the storage system, and when failure is detected, a process corresponding to the failure is executed.

Figure 2:
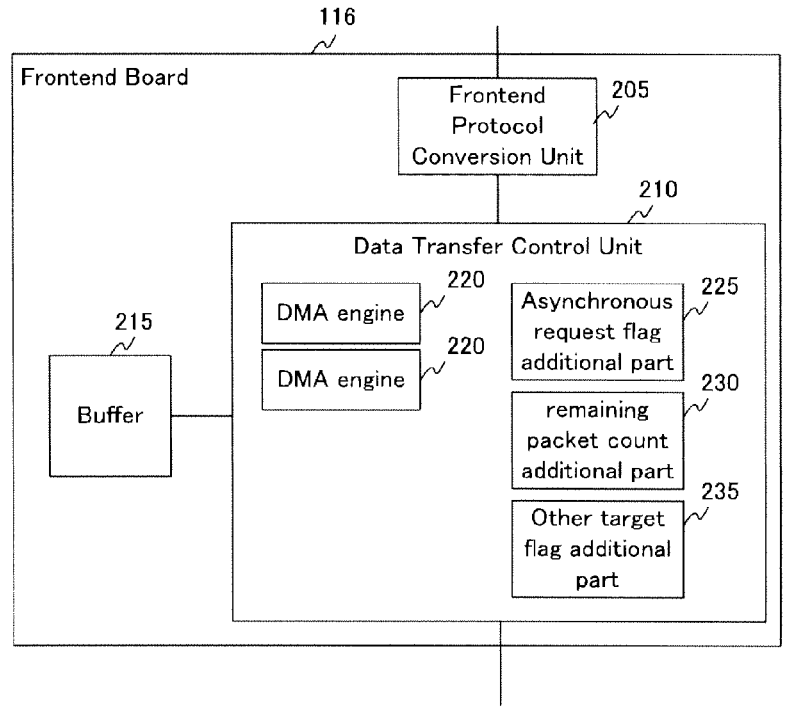
FIG. 2 is a block diagram showing a configuration of a frontend board according to the first embodiment of the present invention.

FIG. 2 is a block diagram showing a configuration of a frontend board according to the first embodiment. The details of the frontend board 116 will be described with reference to FIG. 2. The frontend board 116 includes a frontend protocol conversion unit 205, a data transfer control unit 210 and a buffer memory 215.

The frontend protocol conversion unit 205 converts the protocol used for the communication between the host computer 105 and the storage controller 115 to a protocol used within the storage controller 115. The protocol used for the communication between the host computer 105 and the storage controller 115 can be a Fiber Channel (FC), and a recently adopted Fiber Channel over Ethernet (FCoE) for transmitting FC via an Ethernet (Registered Trademark).

A storage controller 115 is composed of a plurality of boards, for example, as shown in FIG. 1, and the board is often composed of a plurality of components, as shown in FIG. 2. Therefore, the protocol used within the storage controller 115 should preferably be suitable for enabling communication among multiple boards or for communication among components on the board, which include a PCI-Express (Registered Trademark) and a Rapid-IO (Registered Trademark) which are computer bus standards.

The data transfer control unit 210 transmits the data of which writing was required from the host computer 105 to the memory board 118, or reads the data of which read was required from the host computer 100 from the memory board 118. The data transfer control unit 210 further comprises a DMA engine 220, an asynchronous request flag additional part 225, a remaining packet count additional part 230, and an other target flag additional part 235.

The DMA engine 220 executes data transmission between the buffer memory 215 and the memory board 118. The DMA engine 220 stores the data stored in the buffer memory 215 to a predetermined area in the memory board 118 based on the data transfer parameter transferred from a processor 610 (FIG. 6) on the processor board 119. Further, the DMA engine 220 reads the data stored in a cache memory area 2701 (FIG. 27, described later) of the memory board 118 based on the data transfer parameter, and stores the data in a predetermined area of the buffer memory 215.

The asynchronous request flag additional part 225 has a function to add to the packet being sent to the memory board 118 a flag showing that the data transfer processing performed by the DMA engine 220 is an asynchronous request.

The remaining packet count additional part 230 has a function to add to the packet being sent to the memory board 118 the number of packet transmissions required for completing the data transfer processing instructed by the processor 610 on the processor board 119.

The other target flag additional part 235 has a function to add to the packet being sent to the memory board 118 a flag showing that the target being accessed by the data transfer processing performed by the DMA engine 220 differs from the target accessed for the subsequent data transfer processing.

The buffer memory 215 is a data storage area relaying the data transfer between the host computer 105 and the storage controller 115.

Figure 3:
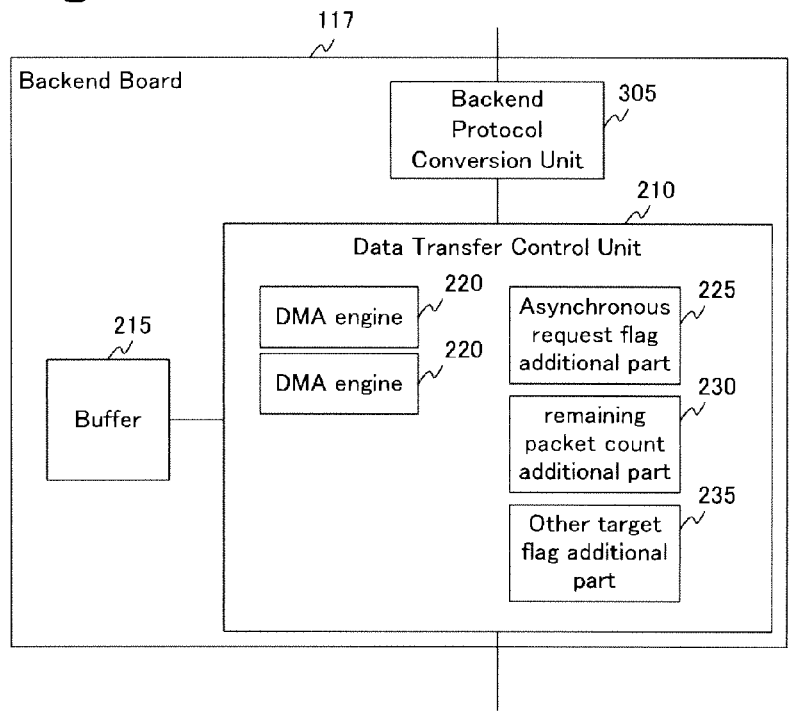
FIG. 3 is a block diagram showing a configuration of a backend board according to the first embodiment of the present invention.

FIG. 3 is a block diagram showing the configuration of a backend board according to the first embodiment. Next, the details of the backend board 117 will be described with reference to FIG. 3. The backend board 117 includes a backend protocol conversion unit 305, a data transfer control unit 210 and a buffer memory 215. Basically, the components are the same as FIG. 2 except for the backend protocol conversion unit 305, so the detailed description thereof is omitted.

The backend protocol conversion unit 305 converts the protocol used for the communication between the storage device 120 and the storage controller 115 to a protocol used within the storage controller 115.

The protocol used between the storage device 120 and the storage controller 115 can be, for example, a Serial Attached SCSI (SAS) or a Fiber Channel (FC) which are standard protocols for coupling hard disks and other memory media.

The storage controller 115 is composed of multiple boards as shown in FIG. 1, and each board is often composed of multiple components as shown in FIG. 2. Therefore, the protocol used within the storage controller 115 should be suitable for communication among multiple boards or among components on the board, such as PCI-Express or Rapid-IO, which are computer bus standards.

Figure 4:
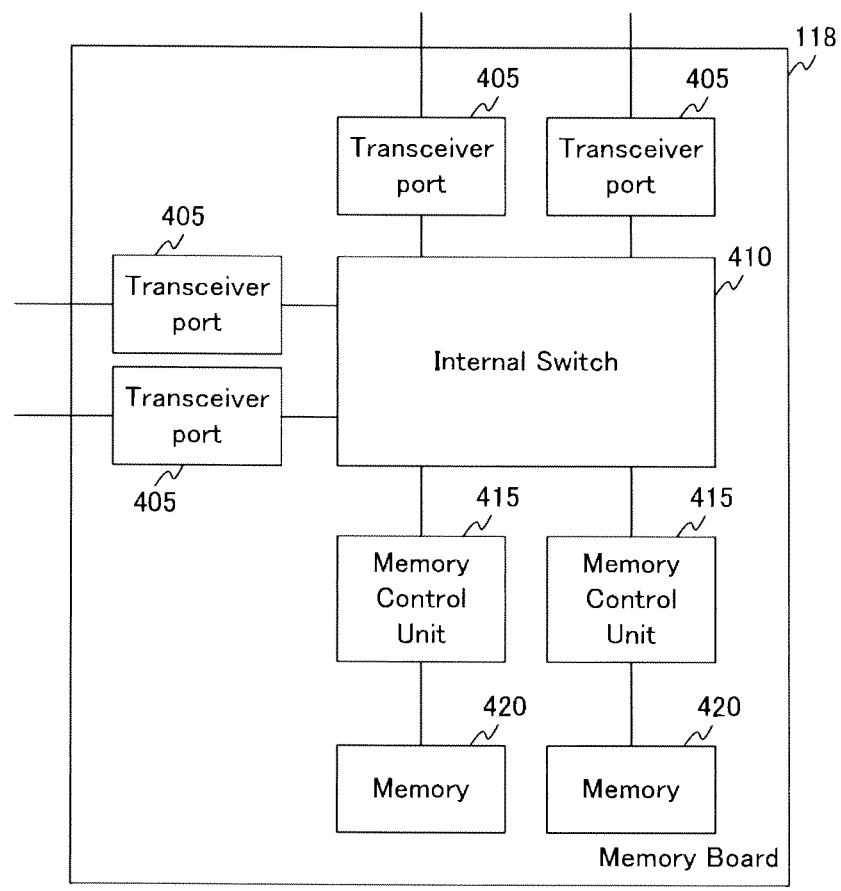
FIG. 4 is a block diagram showing a configuration of a memory board according to the first embodiment of the present invention.

FIG. 4 is a block diagram showing the configuration of the memory board according to the first embodiment. Next, the details of the memory board 118 will be described with reference to FIG. 4. The memory board 118 includes a transceiver port 405, an internal switch 410, a memory control unit 415 and a memory 420.

The transceiver port 405 has a signal processing function corresponding to a physical layer or a data link layer in an OSI reference model. The internal switch 410 couples the configuration units (the frontend board 116, the backend board 117 and the processor board 119) other than the memory board 118 of the storage controller 115 and the memory control unit 415, and relays the communication between these units. The memory control unit 415 interprets the packets received from the frontend board 116 or the like and controls the reading and writing of data with respect to the memory 420.

Figure 5:
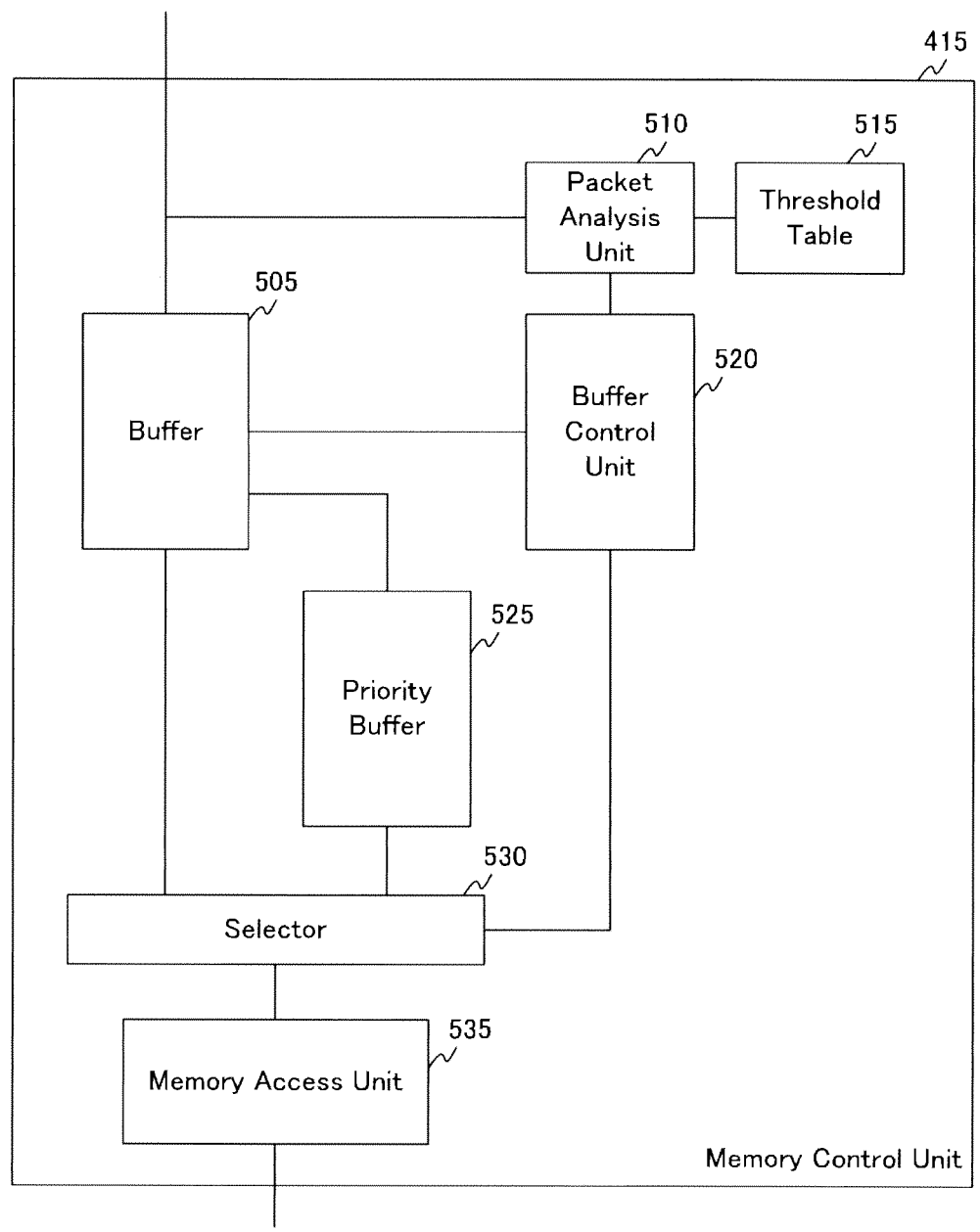
FIG. 5 is a block diagram showing a configuration of a memory control unit according to the first embodiment of the present invention.

FIG. 5 is a block diagram showing the configuration of a memory control unit according to the first embodiment. The details of the memory control unit 415 will be described with reference to FIG. 5. The memory control unit 415 includes an internal buffer 505, a priority buffer 525, a packet analysis unit 510, a buffer control unit 520, a threshold table 515, a selector 530 and a memory access unit 535.

The internal buffer 505 is a buffer for temporarily storing the packets received from the frontend board 116 and the like. The priority buffer 525 is a buffer for temporarily storing the packet determined as a packet to be processed with priority by the packet analysis unit 510. The packet analysis unit 510 decodes the packets received from the frontend board 116 and the like, extracts predetermined information therefrom, and specifies the packet to be subjected to priority processing based on the extracted information.

If there is a packet to be subjected to priority processing, the buffer control unit 520 stores the packet from the internal buffer 505 to the priority buffer 525, and in order to have the packet stored in the priority buffer 525 processed via the memory access unit 535, it outputs a signal to the selector 530 so as to output the packet stored in the priority buffer 525 to the memory access unit 535.

The threshold table 515 is a table showing the correspondence of the thresholds of the number of transmission of remaining packets of a synchronous request, a constrained asynchronous request, and an unconstrained asynchronous request. The details of the synchronous request, the constrained asynchronous request and the unconstrained asynchronous request will be descried later.

The selector 530 performs control to determine whether the packet to be output to the memory access unit 535 is output from the internal buffer 505 or the priority buffer 525. Normally, the selector 530 is set so as to output the packet from the internal buffer 505 to the memory access unit 535. The selector 530 is set so as to output the packet from the priority buffer 525 to the memory access unit 535 when a signal is output from the buffer control unit 520.

The memory 420 comprises a cache memory area for temporarily storing the data communicated with the host computer 105, and a system area for storing the control data, the configuration information, the directory data and the like of the storage system.

<Type of Data Transmission>

Now, the type of data transmission occurring within the storage controller will be described. In the present invention, the data transmission occurring within the storage controller is classified into three types, so as to enhance the efficiency of memory access.

(1) Synchronous Request

The first type is a synchronous request. The synchronous request is a process directly visible as the processing time of a data read request or a data write request with respect to the host computer 105. In other words, the synchronous request is visible as the processing time of the data read request or the data write request with respect to the host computer 105, so the process has a large influence on the performance.

Examples of the synchronous request are a memory read process for reading the data stored in the memory board 118 from the frontend board 116 or the backend board 117, a memory write process for writing data from the frontend board 116 or the backend board 117 to the memory board 118, and a backend write process for writing the data read from the storage device 120 to the memory.

(2) Unconstrained Asynchronous Request

The second type is an unconstrained asynchronous request. The unconstrained asynchronous request is a process not directly visible as the processing time of the data read request or data write request with respect to the host computer 105. One example of the unconstrained asynchronous request is a read-ahead processing of data in a sequential read processing.

(3) Constrained Asynchronous Request

The third type is a constrained asynchronous request. The constrained asynchronous request is a process other than the above-described two types of processes. That is, the constrained asynchronous request is a process that is indirectly visible as the processing time of the data read request or data write request with respect to the host computer 105.

Since the constrained asynchronous request is asynchronous, it can be executed at an arbitrary timing regardless of the data read request or data write request from the host computer 105. However, for example, if performance is influenced if the processor 610 executes the unconstrained asynchronous request a few seconds after receiving the request from the host computer 105, the request should preferably be processed quickly.

Such processes must be completed at a fixed time. Such processes are called a constrained asynchronous request. One example of the constrained asynchronous request is a backend read processing for storing the data stored in the cache memory area of the memory board to the storage device 120 as a sequential write processing.

The storage system provides many functions for realizing business continuity and for storage management. Examples of such functions are a replication function for realizing business continuity and virtualization function for storage management. Necessary processes are executed for providing these functions within the storage controller. Such necessary processes can be classified into the above-described three types of data transmission. For example, out of the above-illustrated replication functions, the replication processing performed asynchronously as the process of the host computer can be classified as an unconstrained asynchronous request transmission.

Figure 6:
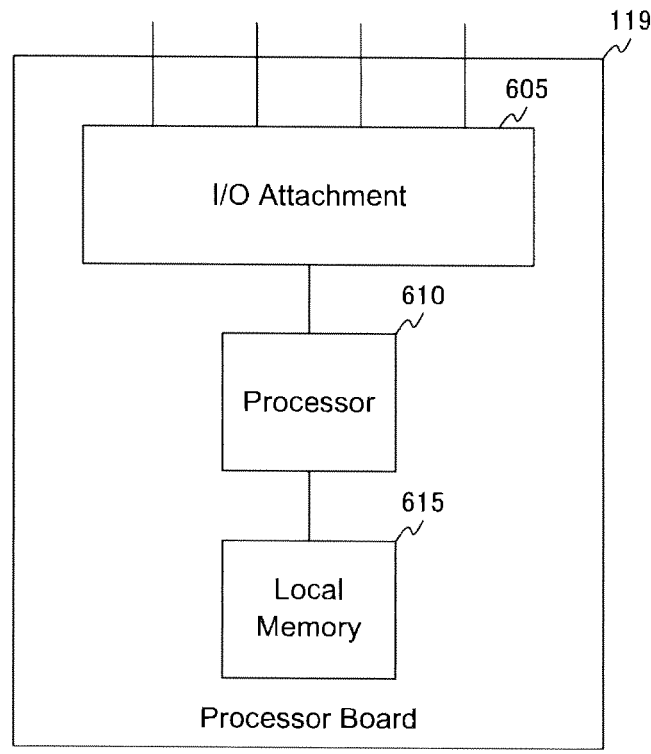
FIG. 6 is a block diagram showing a processor board according to the first embodiment of the present invention.

FIG. 6 is a block diagram showing a configuration of a processor board according to the first embodiment. Next, the details of a processor board 119 will be described with reference to FIG. 6. The processor board 119 includes an I/O attachment 605, a processor 610 and a local memory 615.

The I/O attachment 605 is a unit for connecting the processor 610 to other peripheral devices. The processor 610 controls the storage controller 115. For example, in order to refer to or update the control data, the configuration data, the directory data and the like of the storage system, the processor 610 accesses the system area of the memory 420 storing these data.

Further, in order to transfer the data received from the host computer 105 to the memory board 118, the processor 610 sends a data transfer parameter to the DMA engine 220 within the data transfer control unit 210 of the frontend board 116, thereby realizing data transmission.

Furthermore, the processor 610 monitors failure of the storage controller 115 or the storage device 120, and when failure is detected, a process corresponding to the failure is executed. The local memory 615 stores data handled by the processor 610, the programs executed by the processor 610, and so on.

Figure 7:
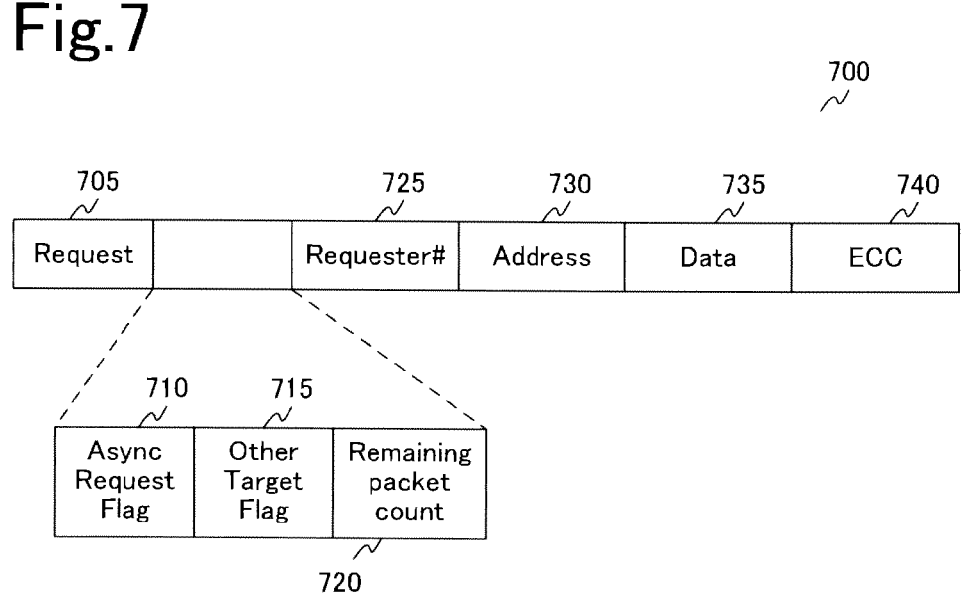
FIG. 7 is an explanatory view of a packet format according to the first embodiment of the present invention.

FIG. 7 is an explanatory view of a packet format according to the first embodiment. The packet format flowing within the storage controller 115 will be described with reference to FIG. 7. The packet 700 flowing within the storage controller 115 includes at least a command field 705, an asynchronous request flag field 710, an other target flag field 715, a remaining packet transmission count field 720, a requester identifier field 725, a transmission destination address field 730, a write data transmission destination 735 if the command field 705 indicates a write command, and an error detection code 740.

A command field 705 shows the type of the command of the corresponding packet 700. If the command is a read command, 0 is entered in the command field 705, and if the command is a write command, 1 is entered thereto. The types of commands can include commands other than the read command and the write command, and in that case, field values can be assigned thereto.

An asynchronous request flag field 710, a remaining packet transmission count field 720 and an other target flag field 715 stores various information added in the frontend board 116 or the backend board 117. The respective informations are described in detail in the description of the frontend board 116, so it will not be described here.

The asynchronous request flag field 710 can be set to 1 if the packet is an unconstrained asynchronous request packet, and set to 2 if the packet is a constrained asynchronous request packet, for example. The asynchronous request flag field 710 can be set to 0 if the packet is a synchronous request packet.

A remaining packet transmission count field 720 indicates the number of packets not yet transmitted based on a data transfer request ordered by the processor to a certain DMA, and if the data transfer request is to end by sending the 10 remaining packets via the DMA engine 220, the number 10 is entered to this field. Thereafter, the value of the remaining packet transmission count field 720 will be decremented for each packet transmission to 9, 8, 7 and so on, and when the last packet is transmitted, the number becomes 1.

If a target of the data transfer request processed currently in a certain DMA engine 220 differs from a target of the subsequent data transfer request, the other target flag field 715 is set to 1, and if the targets are the same, the field is set to 0.

A requester identifier field 725 is information for identifying the requester through which the packet has been sent out. The requester refers to the DMA engine 220 on the frontend board 116 or the backend board 117.

For example, if a plurality of frontend boards 116, such as frontend boards 1, 2 and 3, are mounted on the storage controller 115, and each frontend board 116 has two DMA engines 220, for convenience, the following identifiers are assigned: DMA1 and DMA2 for frontend board 1, DMA3 and DMA4 for frontend board 2, and DMA5 and DMA6 for frontend board 3. At this time, if the packets are sent out via DMA3, the number 3 is entered in the requester identifier field 725.

The address of the target being the transmission destination is entered in the transmission destination address field 730. The address field 730 stores the read destination address if the command field 705 is 0, that is, if the command is a read command. The transmission destination address field 730 stores the write destination address if the command field is 1, that is, if the command is a write command. The transmission destination address field 730 stores the access destination address corresponding to the type of the command shown in the command field.

A write data field 735 is a data field included in the packet if the command field 705 is 1, that is, if the command is a write command. An error detection code field 740 includes an error detection code for verifying whether the field included in the packet 700 excluding the error detection code field 740 has reached the destination correctly from the requester, that is, the DMA engine 220. The verification of the error detection code is mainly performed on the reception side of the packet, but verification can be performed in other sections so as to enhance the reliability of the packet. A parity or a CRC (Cyclic Redundancy Check) can be used as the error detection code. In the following description, the same reference number of each field can be used to describe the information stored in each field (for example, the reference number 720 of the remaining packet transmission count field can be used in the remaining packet transmission count 720).

Figure 8:
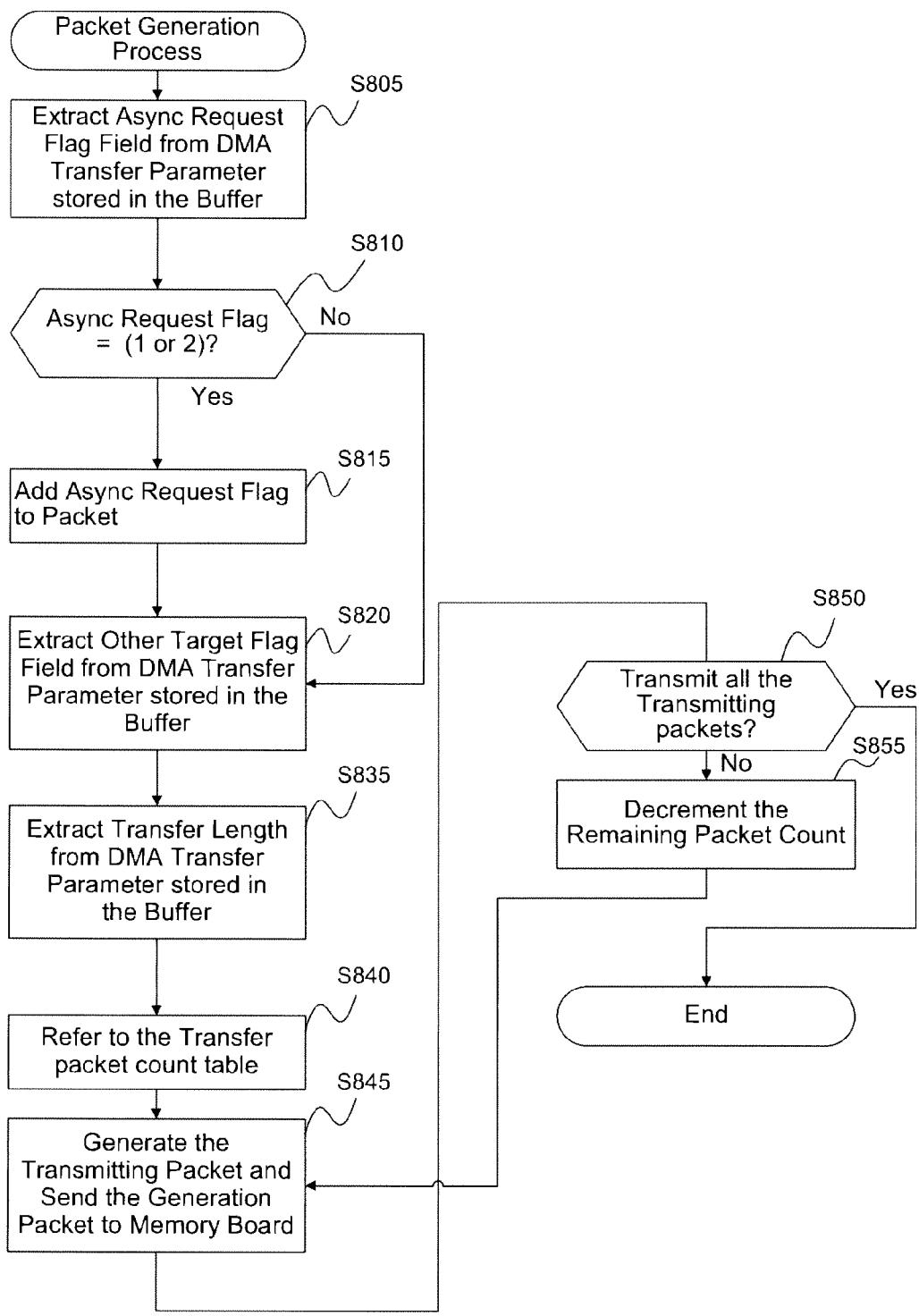
FIG. 8 is a flowchart of a packet generation process according to the first embodiment of the present invention.

FIG. 8 is a flowchart of a packet generation process according to the first embodiment. The packet generation process of the packet transmitted from the frontend board 116 to the memory board 118 will be described with reference to FIG. 8. The packet generation process will be performed by the data transfer control unit 210 of the frontend board 116.

The processor 610 transfers the data transfer parameter related to the data transmission to be processed by the DMA engine 220 via the data transfer control unit 210 to the buffer memory 215. Then, the packet generation process is started when the data transfer parameter is stored in the buffer memory 215.

At first, the asynchronous request flag additional part 225 of the data transfer control unit 210 executes an asynchronous request flag from the data transfer parameter received from the processor (S805). Next, the asynchronous request flag additional part 225 determines whether the data transmission performed via the data transfer parameter is an asynchronous request or not (S810). Actually, the asynchronous request flag additional part 225 performs determination based on whether the asynchronous request flag is 1 or 2.

The asynchronous request flag additional part determines to be an asynchronous request if the asynchronous request flag is 1 or 2, and it directs to add the asynchronous request flag to a packet to the DMA engine which carries out data transfer. (S815). In the present embodiment, if the asynchronous request flag is 1, it means that the request is a constrained asynchronous request, and if the flag is 2, it means that the request is an unconstrained asynchronous request.

Next, the remaining packet count additional part 230 extracts a transfer data length from the data transfer parameter received from the processor 610 (S820). Then, the remaining packet count additional part 230 refers to a transmitting packet count table, and acquires a transmitting packet count corresponding to a transfer data length (S835). The transmitting packet count table will be described in detail later. The remaining packet count additional part 230 notifies the acquired transmitting packet count to the DMA engine 220.

The DMA engine 220 extracts necessary information for constructing a packet from the data transfer parameter including the asynchronous request flag and the remaining packet transmitting count, and constructs the packet to be transmitted. Then, the DMA engine 220 transmits the constructed packet to the memory board 118 (S845).

The DMA engine 220 determines whether the packets to be transmitted have all been transmitted (S850). The DMA engine 220 ends the process if all the packets are transmitted, and if there still remains packets to be transmitted, the DMA engine 220 decrements the remaining packet transmission count (S855) and returns to step S845.

FIG. 9 is an explanatory view of a transmitting packet count table according to the first embodiment. The transmitting packet count table will be described with reference to FIG. 9. The transmitting packet count table is a table that the remaining packet count additional part refers to for notifying the transmitting packet count to the DMA engine. The transmitting packet count table 900 includes a transfer length 905 and a transmitting packet count 910.

A transfer length 905 shows the data transfer length of the data transfer performed via the DMA engine. The data transfer length of data transfer performed via the DMA engine is stored in the transfer length 905. For example, 512 is entered if the data length is 512 bytes, 8192 is entered if the data length is 8192 bytes (8 KB), and 65536 is entered if the data length is 65536 bytes (64 KB).

The transmitting packet count 910 shows the necessary number of packets corresponding to the transfer length 905. The transmitting packet count 910 is computable from two information, the data length which can transmit by one packet, the transfer length 905. That is, the transmitting packet count 910 can be computed by dividing the transfer length 905 by the data length capable of being transmitted via a single packet.

For example, if the data length capable of being transmitted by one packet is 512 bytes, the transmitting packet count corresponding to transfer length of 512 bytes is 1, as shown in FIG. 9. Similarly, if the transfer length is 8192 bytes, the transmitting packet count will be 16, and if the transfer length is 65536 bytes, the transmitting packet count will be 128.

The transmitting packet count 910 will become smaller as the data length capable of being transmitted via a single packet becomes longer. For example, when the transfer length is 65536 bytes, the transmitting packet count will be 64 if the data length capable of being transmitted via a single packet is 1024 bytes, 32 if the single packet data length is 2048 bytes, and 16 if the single packet data length is 4096 bytes.

If the result of dividing the transfer length 905 with the data length capable of being transmitted via a single packet is indivisible, the transmitting packet count 910 sets the value having rounded out the result as the transmitting packet count. For example, it is assumed that the data length capable of being transmitted via a single packet is 520 bytes. If the transfer length is 65536 bytes, the transmitting packet count becomes 126.0307 . . . , so that 127 having rounded out the value is set as the transmitting packet count.

Further, the processor 610 can have the transmitting packet count table 900 computed based on the transfer length and the data length capable of being transmitted via a single packet, and can store in the data transfer control unit. The transmitting packet count table 900 can also be written in advance in a ROM (Read Only Memory) and the like which is a nonvolatile memory, which can be read when booting the storage controller 115.

Further, the transmitting packet count table 900 can have a processor or a controller mounted on a frontend board 116 or a backend board 117, compute the transmitting packet count by the processor or the controller, and can store in the data transfer control unit. If a processor or a controller is mounted on the frontend board or the backend board, the boards are coupled to the data transfer control unit.

Figure 10:
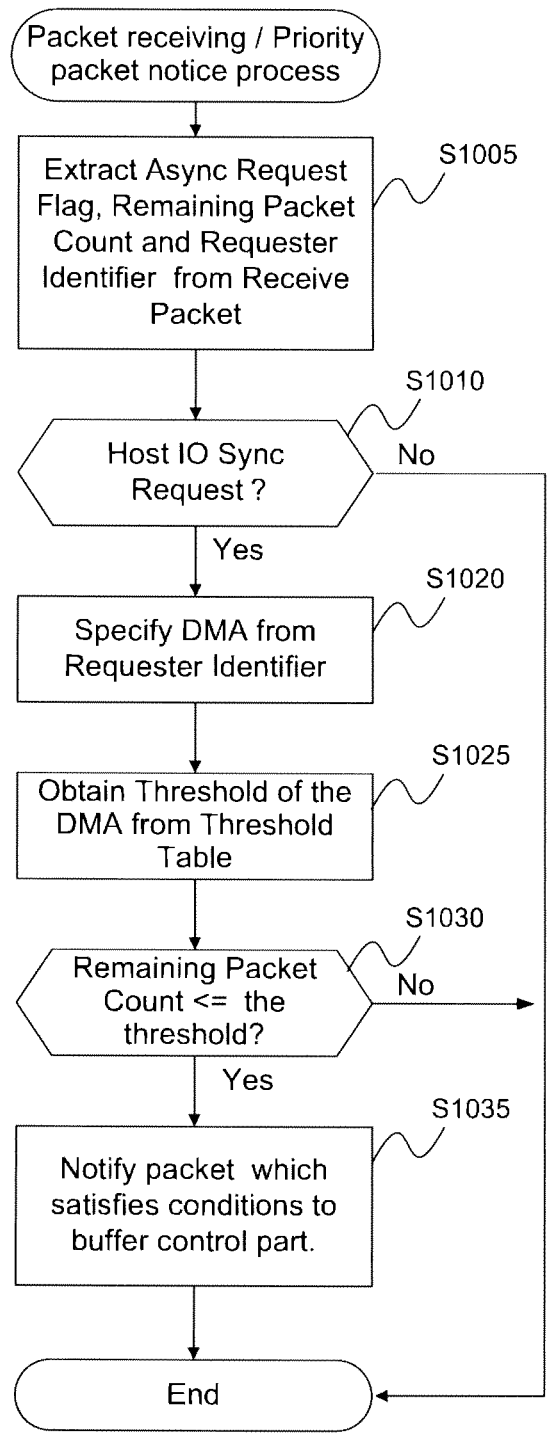
FIG. 10 is a flowchart of a packet receiving process and a priority packet notice process according to the first embodiment of the present invention.

FIG. 10 is a flowchart of a packet receiving process and a priority packet notice process according to the first embodiment. The packet receiving process and the priority packet notice process will be described with reference to FIG. 10. The packet receiving process and the priority packet notice process is performed via the memory control unit 415. The packet receiving process is started when the packet is received from the frontend board 116 or the like to the memory control unit 415.

At first, the packet analysis unit 510 (FIG. 5) decodes the packet received from the frontend board 116 and the like, and extracts an asynchronous request flag 710, a remaining packet transmission count 720 and a requester identifier 725 (S1005). The packet analysis unit 510 utilizes these information and determines the packet of the request to be prioritized.

First, the packet analysis unit 510 determines whether the received packet is a synchronous request or not (S1010). The reason for determining whether the request is a synchronous request or not at first is because the feature directly influences the storage system performance. At this time, if the request is not a synchronous request, that is, if the request is an asynchronous request (S1010: No), the packet analysis unit 510 ends the packet receiving process and the priority packet notice process. What is meant by ending the process is that the received packets are processes normally, that is, in the received order, by the memory access unit 535.

When the packet analysis unit 510 determines that the request is a synchronous request (S1010: Yes), it then determines whether the remaining packet transmission count is equal to or smaller than a threshold value or not. At first, the packet analysis unit 510 refers to the threshold table. If the threshold table is set up for each DMA engine, that is, if a threshold table as shown in FIG. 14 (described later) is used, a threshold corresponding to the requester identifier acquired in step S1020 is acquired.

The packet analysis unit 510 acquires a threshold defined as the synchronous request from the threshold table (S1025). Thereafter, the packet analysis unit 510 compares the acquired threshold with the remaining packet transmission count included in the received packet, and determines whether the remaining packet transmission count is equal to or below a threshold or not (S1030).

If the remaining packet transmission count is equal to or below a threshold (S1030: Yes), the packet analysis unit 510 determines that the packet (request) is preferentially processed in the memory access unit 535. If not (S1030: No), the packet analysis unit 510 ends the packet receiving process and the priority packet notice process.

The packet analysis unit 510 notifies the packet determined as a packet is preferentially processed to the buffer control unit 520 (S1035), and ends the packet receiving process and the priority packet notice process.

The information notified from the packet analysis unit 510 to the buffer control unit 520 can be the information for specifying the storage location (such as on the nth step) in the internal buffer for temporarily storing the packet received by the memory control unit 415, or for specifying the packet to be subjected to priority processing. Information capable of specifying the packet to be subjected to priority processing can be, for example, a requester identifier, an access destination address, an identifier unique within the storage controller 115 provided with respect to the data transfer request, or a combination thereof.

The information for specifying the packet to be subjected to priority processing is stored in the internal register or the like within the memory control unit 415, and the packet having all 1 as a result of acquiring a logical product of these information of the packets stored in the internal buffer is specified as the packet to be subjected to priority processing. As long as the packet to be subjected to priority processing can be specified, the information can be other than those mentioned above.

The target type of the packet to be subjected to priority processing determined by the packet analysis unit 510 can be one or more than one. However, if the target of the packets to be subjected to priority processing is increased too much, there is fear that the access performance may not be enhanced so much as compared to the case where priority processing is not performed, so that the target packet type should be a few types.

In step S1010 of FIG. 10, if the received packet is an asynchronous request, the packet analysis unit 510 ends the packet receiving process and the priority packet notice process. As described, an asynchronous request includes a constrained asynchronous request and an unconstrained asynchronous request. We will now describe an example in which the constrained asynchronous requests of the asynchronous requests are competitive.

If the constrained asynchronous request competes with the synchronous request, the packet analysis unit 510 prioritizes the synchronous request. If the constrained asynchronous request competes with the unconstrained asynchronous request, the packet analysis unit 510 prioritizes the constrained asynchronous request.

Figure 11:
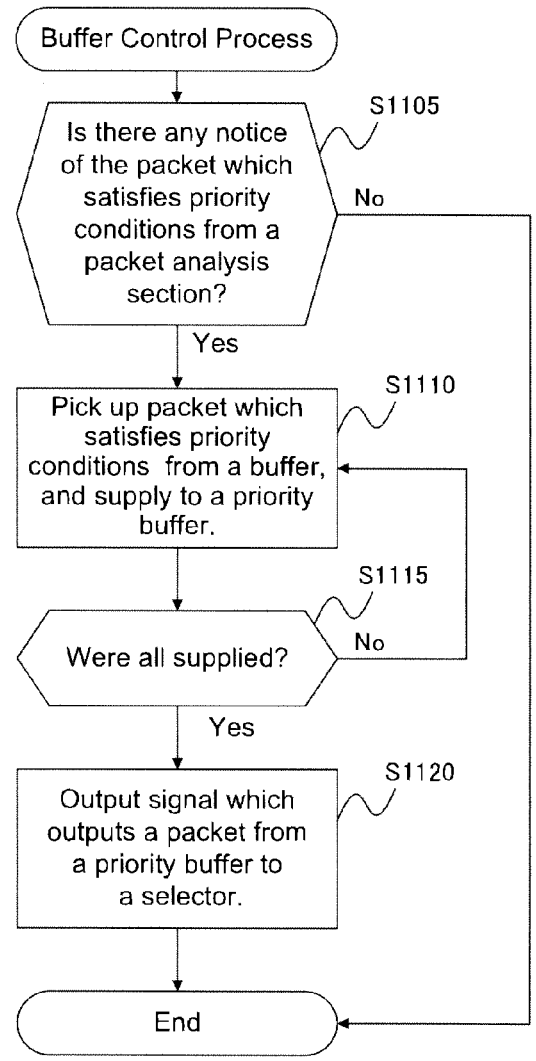
FIG. 11 is a flowchart of a buffer control process according to the first embodiment of the present invention.

FIG. 11 is a flowchart of a buffer control processing according to embodiment 1. The buffer control process will be described with reference to FIG. 11. The buffer control process is executed by the buffer control unit 520. The buffer control process is started at a timing when some type of notice is received from the packet analysis unit 510. Some type of notice includes the number of steps of the internal buffer, or the various information capable of specifying the packet to be subjected to priority processing.

The buffer control unit 520 confirms whether some type of notice is received from the packet analysis unit 510 (S1105). If no notice is received from the packet analysis unit 510, the buffer control unit 520 ends the buffer control process. What is meant by ending the process is that the received packet is processed normally, that is, in the received order, by the memory access unit 535.

If some type of notice is received from the packet analysis unit 510, the buffer control unit 520 moves the packet from the internal buffer 505 to the priority buffer 525 based on the received notice (S1110). The specification of the packet being moved is as described above. The buffer control unit 520 confirms whether the all the packets that should be carried out a priority processing are moved from the internal buffer 505 to the priority buffer 525 (S1115).

When all the packets to be subjected to priority processing are moved from the internal buffer 505 to the priority buffer 525, the buffer control unit 520 outputs a signal to the selector 530 (S1120). The signal output from the buffer control unit 520 indicates that the packet stored in the priority buffer 525 is output to the memory access unit 535.

<Threshold Table>

Figure 12:
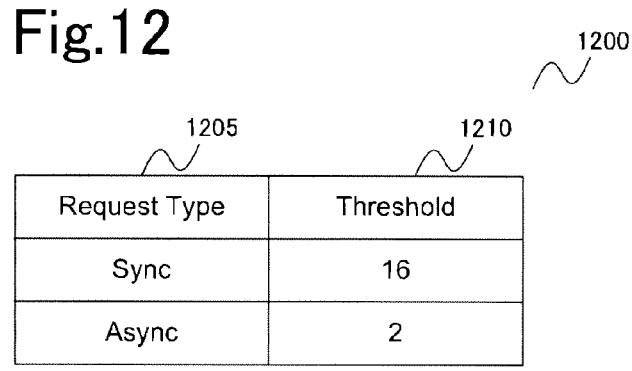
FIG. 12 is an explanatory view of a threshold table according to the first embodiment of the present invention.

FIG. 12 is an explanatory view of a threshold table according to the first embodiment. Now, the threshold table used for determining the application of priority processing will be described with reference to FIG. 12. The threshold table 1200 includes a request type 1205 and a threshold 1210. The request type 1205 shows whether the request is a synchronous request (Sync) or an asynchronous request (Async). The threshold 1210 stores the value of the remaining packet transmission count which is one of the conditions of application of the packet to be subjected to priority processing in the memory access unit 535. The packet having a remaining packet transmission count below this threshold is the packet to which priority processing is applied.

FIG. 13 is an explanatory view of modified example 1 of the threshold table. The difference of the threshold table 1300 from the threshold table 1200 of FIG. 12 is that the asynchronous request is further classified into an unconstrained asynchronous request (Async) and a constrained asynchronous request (Async (restriction)), and the other points are the same as FIG. 12.

FIG. 14 is an explanatory view of modified example 2 of the threshold table. The difference of the threshold table 1400 from the threshold table 1200 of FIG. 12 is that a request identifier is further included, and the other items are the same as FIG. 12. By further including a requester identifier 1405, the resolution of the packet subjected to prioritized processing of the synchronous request is enhanced.

FIG. 15 is an explanatory view of modified example 3 of the threshold table. The difference of the threshold table 1500 from the threshold table 1200 of FIG. 12 is that a transfer length 1510 showing the type of the transfer length (Long, Short) is further included, and the other items are the same as FIG. 12. The synchronous request processed within the storage controller 115 includes a long request of a few dozen KB (Kilo Bytes) transferred mainly via sequential access and a short request of a few KB or smaller transferred via random access.

Therefore, for example, in the case of a sequential access, the transmission length 1510 is used with "Long", and random access, the transmission length 1510 is used with "Short". In the specification of the packet to be subjected to priority processing performed via the memory control unit 415, a problem of sinking of the process as described below may occur if the determination is performed simply under the condition that the request is a synchronous request and that the remaining packet transmission count is equal to or smaller than the threshold According to such determination, the synchronous request performed via random access can be easily subjected to priority processing than the synchronous request via sequential access, and the latter synchronous request will not be processed easily and may sink. In order to prevent such situation, as shown in the threshold table of FIG. 15, the type of the request and the transfer length are associated further. This process will be described further with reference to FIGS. 16 and 17.

Figure 16:
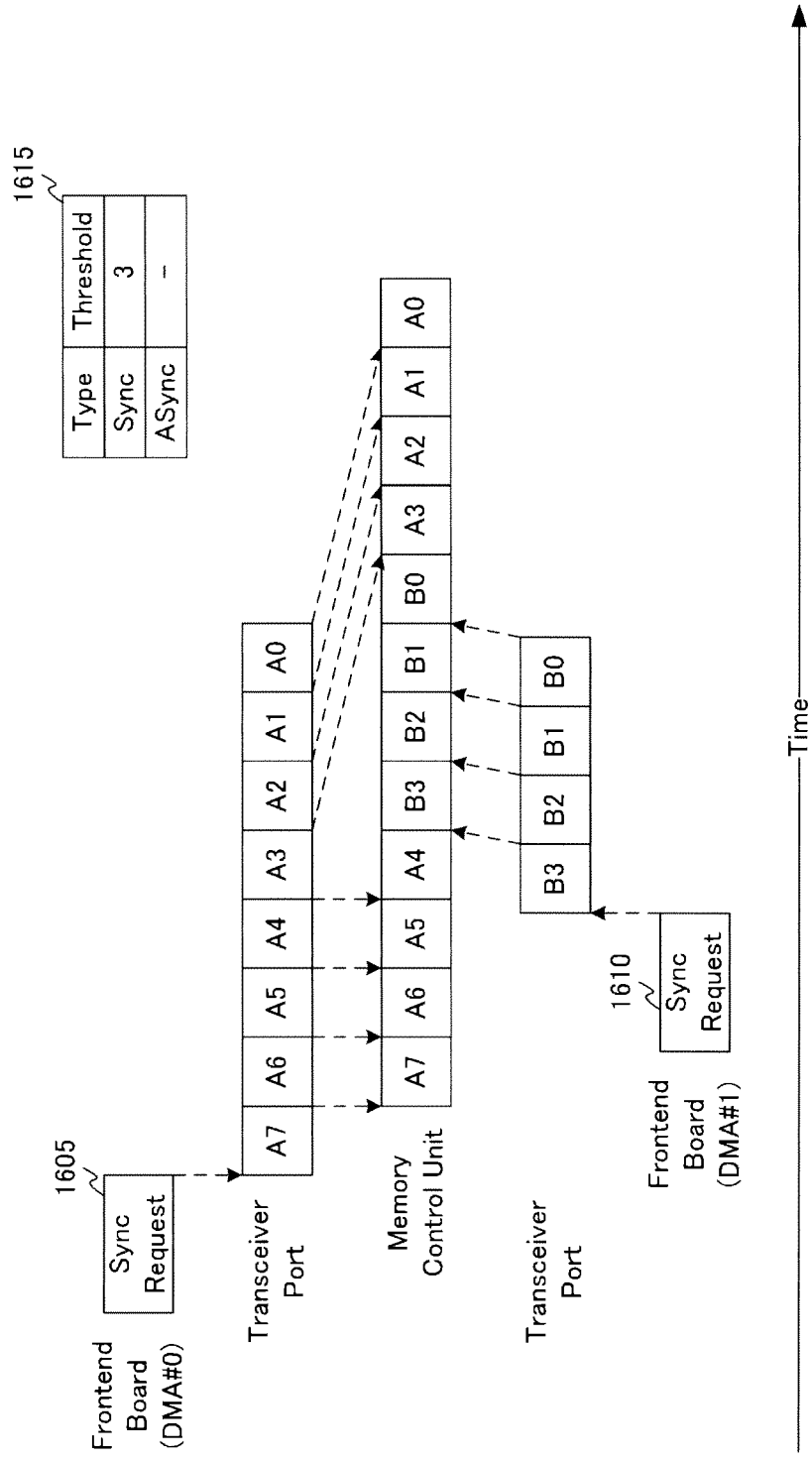
FIG. 16 is a view showing the flow of the process performed in a memory control unit when competition of synchronous requests having different transfer lengths occurs according to the prior art.

FIG. 16 is a view showing one example of the process performed via a memory control unit when synchronous request having different transfer lengths compete. The packet processing performed via the memory control unit 415 when the priority processing packet is determined by request type and remaining packet transmission count will be described with reference to FIG. 16. FIG. 16 shows that the data transfer of the synchronous request 1605 and 1610 are performed from two frontend boards 116, and how the respective data transfer are processed via the memory control unit 415.

For convenience, the two frontend boards 116 are referred to as a frontend board 116A and a frontend board 116B. Further, the DMA engine 220 of the frontend board 116A is referred to as DMA0, and the DMA engine 220 of the frontend board 116B are referred to as DMA1.

Further, the data transfer of DMA0 is set to sequential access, and the data transfer of DMA1 is set to random access. Thereby, the total number of packets sent by DMA0 is set to 8, and the total number of packets sent by DMA1 is set to 4. In the present drawing illustrating the flow of data transfer process, the time is elapsed from the left to right. The threshold table 1200 illustrated in FIG. 12 is utilized as the threshold table 1615. In FIG. 16, the threshold of the synchronous request of the threshold table is 3.

First, transfer of data with respect to the synchronous request from DMA0 is started. For convenience, the data transfer from DMA0 is referred to as data transfer A. In data transfer A, packets reached the transceiver port 405 of the memory control unit 415 in the order of A7, A6 and A5, and finally, the packet of A0 is received. Then, the packets reaching the transceiver port 405 are received by the memory control unit 415 and processed thereby. The number following A shows the remaining packet transmission count. For example, in A7, the remaining packet transmission count is 7, and in A0, the remaining packet transmission count is 0.

It is assumed that after starting transfer of data transfer A, a data transfer from the DMA1 with respect to the synchronous request is started. Similarly as data transfer A, packets are received by the memory control unit 415 via the transceiver port 405 in the order of B3, B2, B1 and B0. Further, the number following B shows the remaining packet transmission count.

Now, it is assumed that the first packet of data transfer B, that is, the B3 packet, reaches the memory control unit 415 after the A4 packet of data transfer A has reached thereto. The memory control unit 415 refers to the threshold table 1615, and prioritizes the processing of data transfer B in which the remaining packet count is 3. Therefore, after processing the A4 packet of data transfer A, the memory control unit 415 prioritizes the processing of the packet of data transfer B. Then, after the processing of data transfer B is completed, the memory control unit 415 restarts the processing of data transfer A.

A case where the total packet number is small is illustrated in FIG. 16, but if the total packet number is as large as a few dozen to a few hundred packets, there may be cases where a request having a short transfer length such as a random access request may force a request having a long transfer length such as a sequential access request to wait for a long time. The present invention solves such problem by the technique described with reference to FIG. 17 and thereafter.

Figure 17:
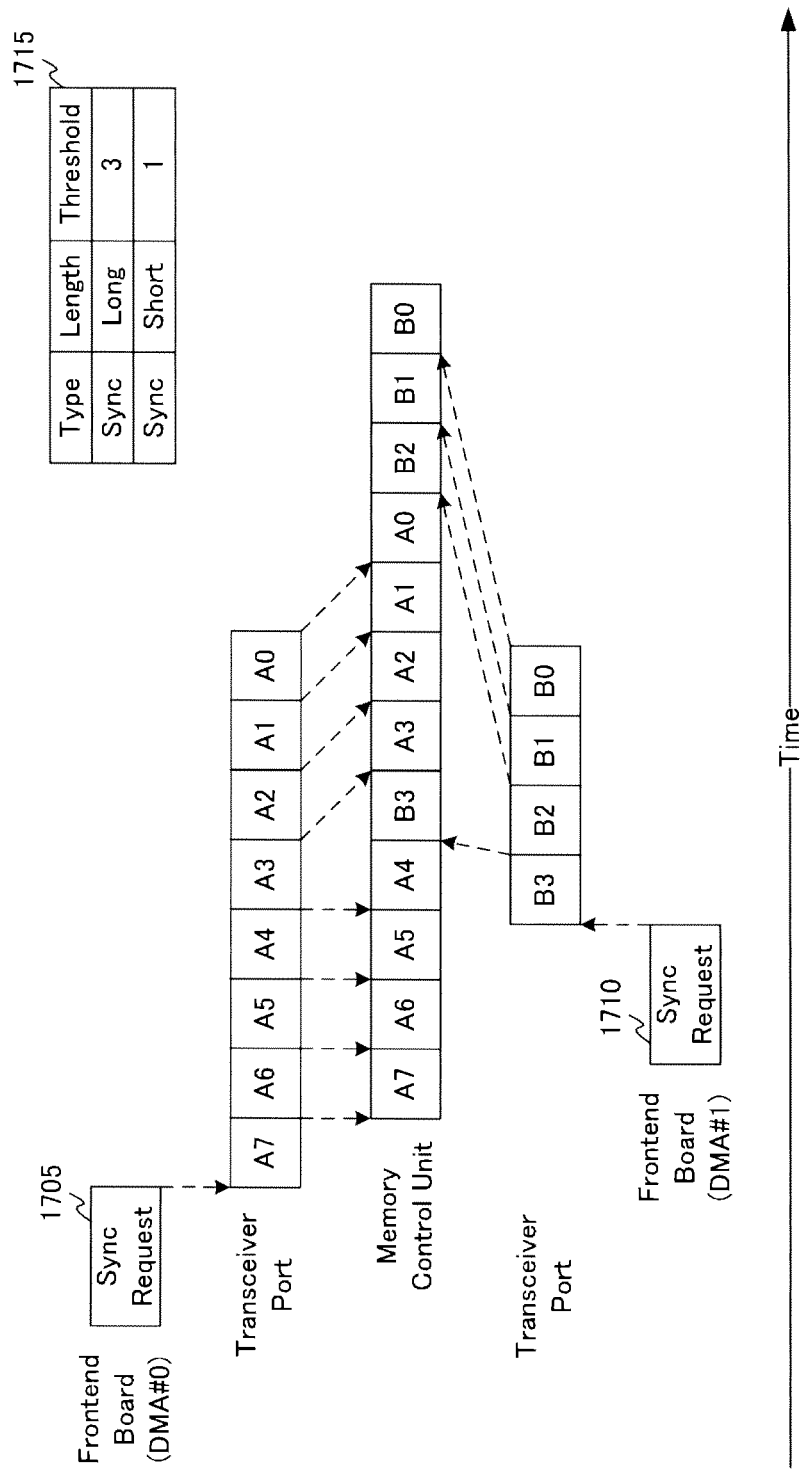
FIG. 17 is a view showing the flow of the process performed in a memory control unit when competition of synchronous requests having different transfer lengths occurs according to the first embodiment of the present invention.

FIG. 17 shows the flow of packet processing in the memory control unit 415 when the priority processing packet is determined based on the request type, the remaining packet transmission count and also the transfer length. FIG. 17 shows how the data transfer of synchronous requests transferred respectively from two frontend boards 116 is processed in the memory control unit 415. Now, in the threshold table 1715 of FIG. 17, the threshold table 1500 of FIG. 15 is used, and the threshold of the synchronous request having a long transfer length is set to 3 and the threshold of the request having a short transfer length is set to 1. Now, the flow of data transfer is the same as FIG. 16. In FIG. 16, after the A4 packet has been processed in the memory control unit 415, the processing of data transfer B is prioritized. In the example of FIG. 17, the threshold differs by whether the transfer length is long or short, so the following operation is performed.

The memory control unit 415 determines whether the initially received packet is a request having a long transfer length or a request having a short transfer length. Actually, the memory control unit 415 determines the same based on the remaining packet transmission count included in the received packet. At that time, the memory control unit 415 is equipped with the transmission packet count table illustrated in FIG. 9, and performs the determination by checking the remaining transmission packet count and the transmission packet count table. For example, if the remaining packet transmission count included in the initially received packet is 128, the memory control unit 415 determines that the packet is a request having a long transfer length, and refers to the threshold corresponding to a "Long" transfer length of the threshold table 1715.

The memory control unit 415 processes the B3 packet after processing the A4 packet. Thereafter, the memory control unit 415 processes the A3 packet. Now, the remaining packet transmission count of the synchronous request having a long transfer length becomes equal to threshold 3 or smaller, and the priority processing is applied to the synchronous request 1705. As a result, after processing the A3 packet, the processing of data transfer A, which are A2, A1 and A0, are prioritized. Then, after the processing of data transfer A is completed, the memory control unit 415 processes the data transfer B again.

According to a method for determining whether the request has a long transfer length or a short transfer length, for example, a sequential access flag is provided to a portion of the packet format illustrated in FIG. 7, and if the request is determined to have a long transfer length based on the transfer length contained in the data transfer parameter from the processor and the transmission packet count table illustrated in FIG. 9, the sequential access flag is turned on. Then, the memory control unit 415 determines that the packet relates to a request having a long transfer length if the sequential access flag contained in the received packet is turned on, and refers to the threshold corresponding to a "Long" transfer length in the threshold table.

The above-described process enables to prevent the sinking of the sequential access. Further, by ending the data transfer process in progress and starting the next data transfer process in the memory control unit 415, the data transfer quantity per unit time of the whole storage system can be increased. As a result, the performance of the storage system can be enhanced.

Figure 18:
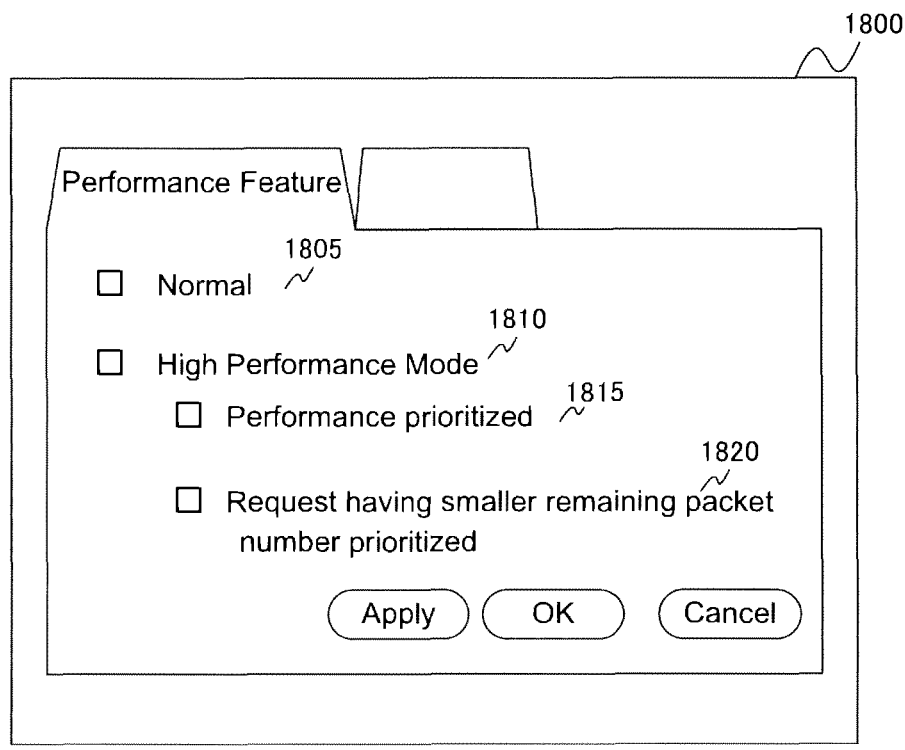
FIG. 18 is an explanatory view of a management screen in a management terminal according to the first embodiment of the present invention.

FIG. 18 illustrates an example of a management screen 1800 of a management terminal 180 managing the storage system. The conventional mode to which the present invention is not applied is called a normal mode 1805, and the mode to which the present invention is applied is called a high performance mode 1810. If the performance is to be further prioritized in the high performance mode 1810, a "performance prioritized" mode 1815 is selected, and if a request having a smaller remaining packet transmission count is to be prioritized, a "request having smaller remaining packet prioritized" mode 1820 is selected.

One example of separating the use of the "performance prioritized" mode 1815 and the "request having smaller remaining packet prioritized" mode 1820 is to determine which mode to be used by whether sequential access or the random access should be prioritized. In other words, if sequential access is to be prioritized, the "performance prioritized" mode 1815 is to be selected, and if random access is to be prioritized, the "request having smaller remaining packet prioritized" 1820 is to be selected.

As described, a system administrator can change the method for controlling the storage system based on the environment of operation of the storage system. Further, the method for controlling the storage system can be changed not only via the setting of the management screen but also automatically within the storage system.

Figure 19:
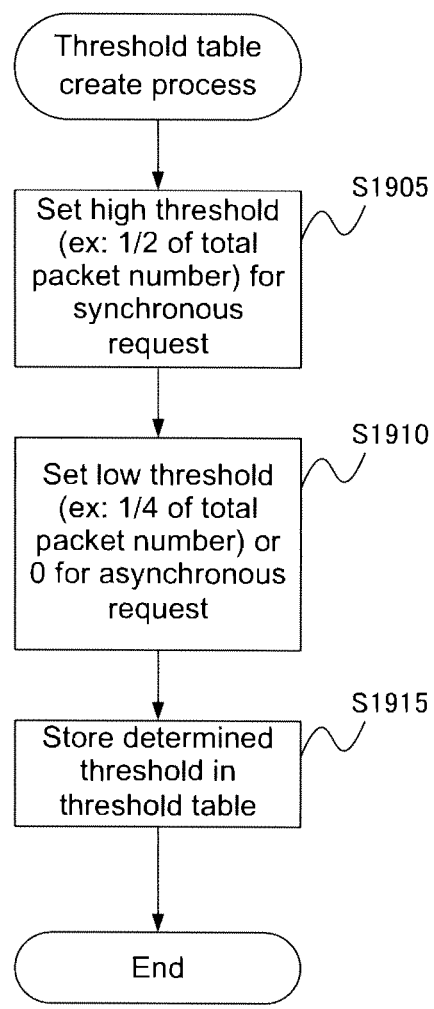
FIG. 19 is a flowchart of a threshold table create process according to the first embodiment of the present invention.

FIG. 19 illustrates an example of a flowchart for creating a threshold table. Next, the operation for creating a threshold table will be described with reference to FIG. 19. The creation of the threshold table is performed by the processor 610 writing thresholds into the threshold table. In the example of FIG. 19, the processor 610 creates the threshold table illustrated in FIG. 12.

At first, the processor 610 determines a threshold with respect to a synchronous request. The processor 610 sets half a value of the total packet transmission count in the data transfer of a synchronous request, for example (S1905). The threshold should be set high so as to enhance the performance of sequential access.

Thereafter, the processor 610 determines a threshold with respect to an asynchronous request (S1910). In the present invention, the synchronous request is processed with priority in the memory control unit 415 than the asynchronous request, so the threshold of the asynchronous request can basically be set to 0, but a certain value (such as ¼ of the total packet count) can also be set.

Lastly, the processor 610 stores the threshold determined by these steps in the threshold table (S1915) and ends the process. As a result, the threshold table illustrated in FIG. 12 is created. Now, if a threshold table illustrated in FIG. 13 is to be created, the steps for determining the threshold of an asynchronous request will be as follows.

The processor 610 determines a threshold regarding an unconstrained asynchronous request. According to the present invention, the synchronous request is processed with higher priority by the memory control unit 415 than the unconstrained asynchronous request, so the threshold is set to 0. Thereafter, the processor 610 determines a threshold with respect to the constrained asynchronous request.

From the viewpoint of priority order, the constrained asynchronous request has a priority order immediately inferior to a synchronous request, so the threshold thereof should be set smaller than that of the synchronous request. For example, if the threshold of the synchronous request is set to half of the total packet number, the threshold of the constrained asynchronous request should be ¼ of the total packet number.

Lastly, the processor 610 stores the threshold determined by the above-described steps in the threshold table and ends the process. As a result, the threshold table illustrated in FIG. 13 is created.

Figure 20:
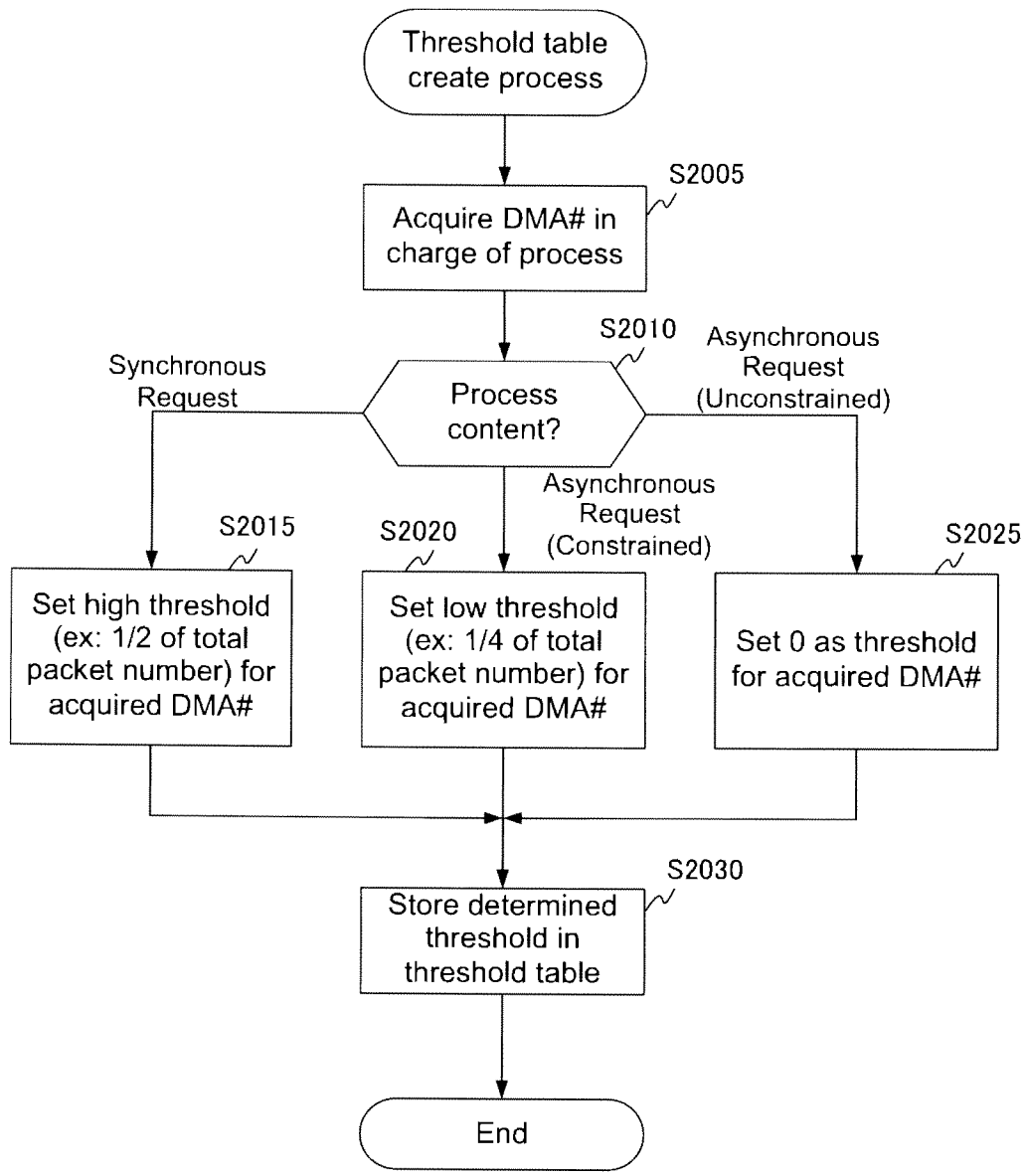
FIG. 20 is a flowchart of a threshold table create process according to the first embodiment of the present invention.

FIG. 20 shows another example of a flowchart for creating a threshold table. In the example of FIG. 20, the processor 610 creates the threshold table of FIG. 14. At first, the processor 610 selects a requester (DMA engine 220) ordering the data transfer process (S2005). The processor 610 may choose arbitrary requesters from the requester which can communicate with targets.

Next, if the processor 610 itself issues the synchronous request process, the threshold is set high regarding a requester identifier of a selected requester. For example, half the value of the total packet transmission count in the data transfer of a synchronous request will be set (S2015).

If the processor 610 itself issues the constrained asynchronous request process, the threshold of the requester identifier of the selected requester is set lower than the threshold of the synchronous request. For example, if the threshold of the synchronous request is set to half the total packet number, the threshold of the constrained asynchronous request is set to ¼ of the total packet number (S2020).

If the processor 610 itself issues the unconstrained asynchronous request process, the threshold of the requester identifier of the selected request is either set to 0 or to a value smaller than the threshold of the constrained asynchronous request process (S2025).

Lastly, the processor 610 itself stores the determined threshold in the threshold table (S2030) and ends the threshold table creation process.

Figure 21:
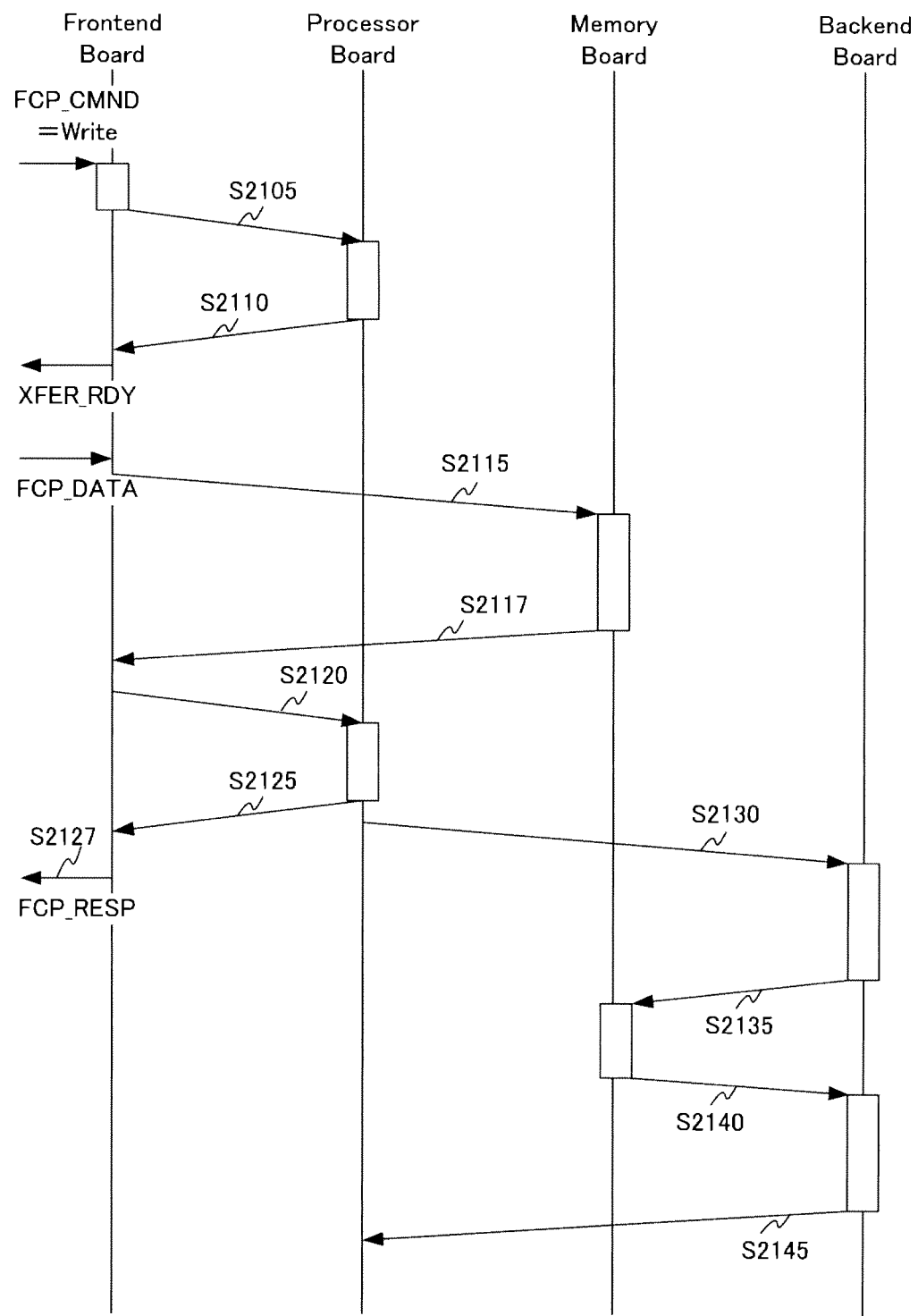
FIG. 21 is a sequence chart of respective components of the storage controller when the storage controller receives a write request from a host computer according to the first embodiment of the present invention.

FIG. 21 is a view showing one example of a sequence chart of each component of the storage controller 115 when the storage controller 115 according to the first embodiment of the present invention receives a write request from the host computer 105. The transmission and reception of data among components of the storage controller 115 when the storage controller 115 receives a write request from the host computer 105 will be described with reference to FIG. 21.

First, if the front end board 116 receives a write command, communication will be performed between the frontend board 116 (transmission source) and the processor board 119 (transmission destination) (S2105). The data transmitted from the frontend board 116 to the processor board 119 is data for notifying that a certain request (such as a data write request) has been received from the host computer 105 to the frontend board 116. In FIG. 21, it is assumed that a data write request from the host computer 105 has been received by the processor board 119 based on the data communicated in S2105.

Next, communication is performed between a processor (transmission source) and a frontend board (transmission destination) (S2110). Further, the data transmitted from the processor 610 to the frontend board 116 is data for notifying the host computer 105 that the data received from the host computer 105 is writable in a cache memory area 2701 (FIG. 27, mentioned later) of the memory board 118.

When the frontend board 116 sends the data (XFER_RDY) received by the communication shown via sequence S2110 to the host computer 105, the host computer 105 actually sends a write data (FCP_DATA) of the storage device 120 to the frontend board 116.

When the write data is received from the host computer 105, the frontend board 116 sends the write data received from the frontend board 116 to the memory board 118 based on the command added to the packet received from the processor 610 by the communication shown by sequence S2110 (S2115).

Then, when the received write data is stored in the cache memory area 2701, the memory board 118 sends a response packet to the frontend board 116 (S2117). After transfer of write data to the cache memory area 2701 is completed, the frontend board 116 communicates data setting the frontend board 116 as the transmission source and the processor 610 as the transmission destination. If the transmission of write data to the cache memory area 2701 is completed, communication will be performed between the front end board 116 (transmission source) and the processor 610 (transmission destination) (S2120).

The data transmitted from the frontend board 116 to the processor 610 is data for notifying the processor 610 that the writing of data to the cache memory area 2701 has been completed.

In order to notify the host computer 105 that the writing of data completed the processor 610 to the cache memory area 2701, communication is performed between the processor 610 and the frontend board 116 (S2125). The processor 610 having received the write complete notice transfers the write complete notice to the host computer 105, and notifies completion of the write request (FCP_RESP) (S2127).

When a predetermined time has elapsed or a predetermined condition has been satisfied after the write data is stored in the cache memory area 2701, the storage controller 115 stores the write data stored in the cache memory area 2701 in the storage device 120. This process is called a backend read process. Thus, data is communicated with the processor 610 set as the transmission source and the backend board 117 set as the transmission destination (S2130).

Now, the data transmitted from the processor 610 to the backend board 117 is data ordering the backend board 117 to store the write data stored in the cache memory area 2701 to the buffer memory 215 of the backend board 117.

When data is received from the processor 610, the backend board 117 transmits a packet including the command having added a request for acquiring the write data stored in the cache memory area 2701 to the memory control unit 415 (S2135). The backend board 117 transmits the packet containing the command which acquires the write data stored in the cache memory area 2701 to the memory control unit 415, if the data from the processor 610 is received (S2135).

When a packet including the command which acquires the write data is received, the memory control unit 415 transmits the write data stored in the cache memory area 2701 of the memory board 118 to the backend board 117. Then, the memory control unit 415 transmits a response packet to the backend board 117 after the transmission of write data is completed (S2140).

When the write data stored in the cache memory area 2701 of the memory board 118 is acquired, the backend board 117 transmits data to the processor 610 for notifying the processor 610 of the processor board 119 that the acquisition of write data stored in the cache memory area 2701 of the memory board 118 is completed (S2145).

Thereafter, the backend board 117 stores the write data acquired via communication of sequence S2145 to the storage device 120.

By the above process, the data subjected to the write request from the host computer 105 to the storage device 120 is stored in the storage device 120.

Figure 22:
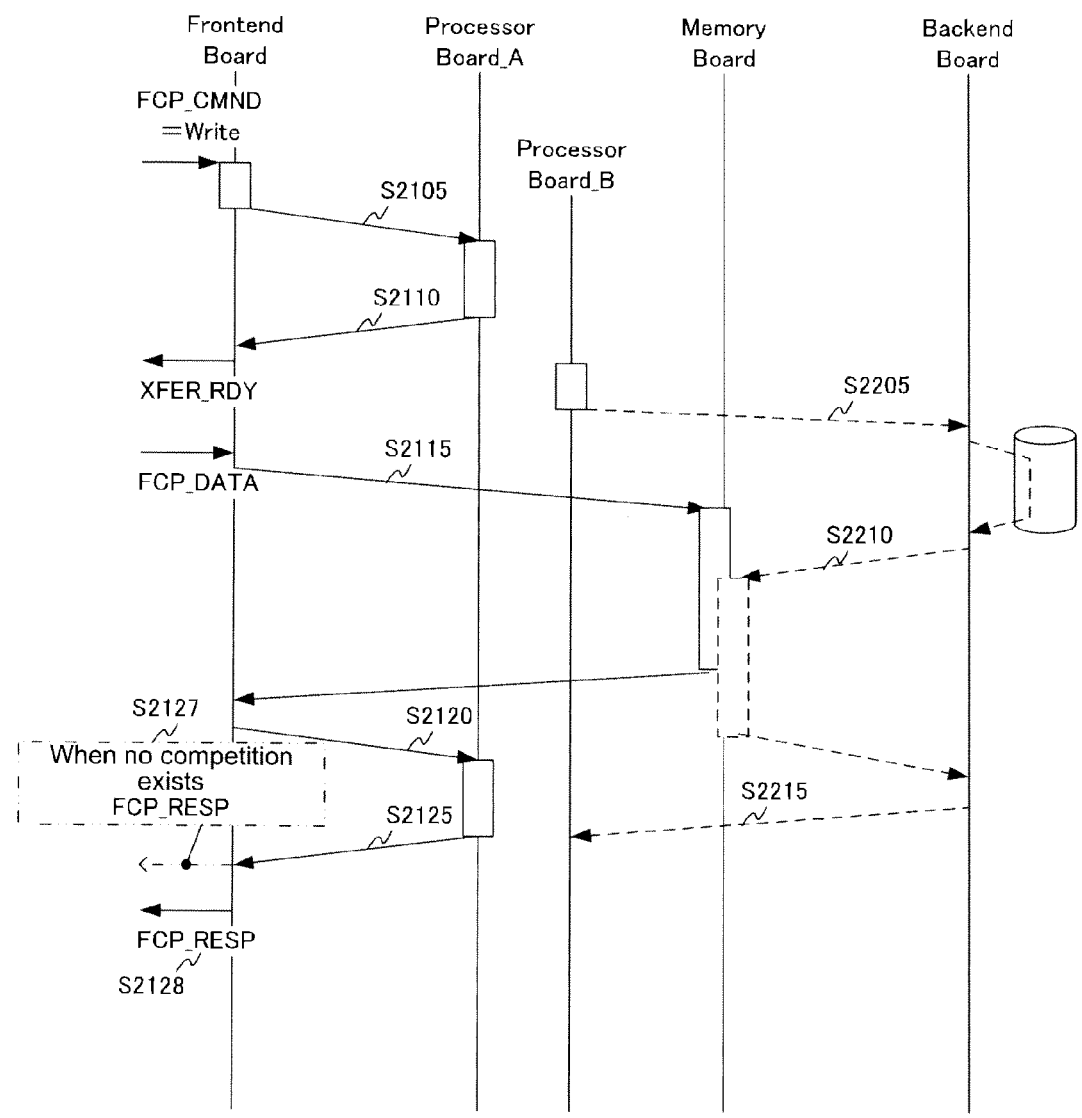
FIG. 22 is a sequence chart of respective components of the storage controller when the write request from the host computer received by the storage controller competes with other requests according to the first embodiment of the present invention.

FIG. 22 shows another example of a sequence chart of components of the storage controller 115 when the storage controller 115 according to the first embodiment of the present invention receives a write request from the host computer 105.

The difference of the sequence chart of FIG. 22 compared to that of FIG. 21 is that while the frontend board 116 is storing the write data from the host computer 105 in the cache memory area 2701, another data transfer (data transfer from the backend board 117 to the memory board 118) competes therewith. The description of the portion of the sequence equivalent to FIG. 21 will be omitted.

In order to distinguish the two data transmissions, the write request from the frontend board 116 is shown via a solid line, and the write request from the backend board 117 is shown via a broken line. As shown in the middle of FIG. 22, the two data transmissions compete in the memory board 118, and the write request from the frontend board 116 has a longer processing time compared to FIG. 21. As a result, the processing time of the write request from the frontend board 116 becomes longer compared to FIG. 21. In other words, when competition exists, the write complete notice (FCP_RESP) to the host computer 105 is delayed as shown in sequence S2128 compared to the sequence S2127 where no competition exists. This state will be described in detail with reference to FIG. 23.

Figure 23:
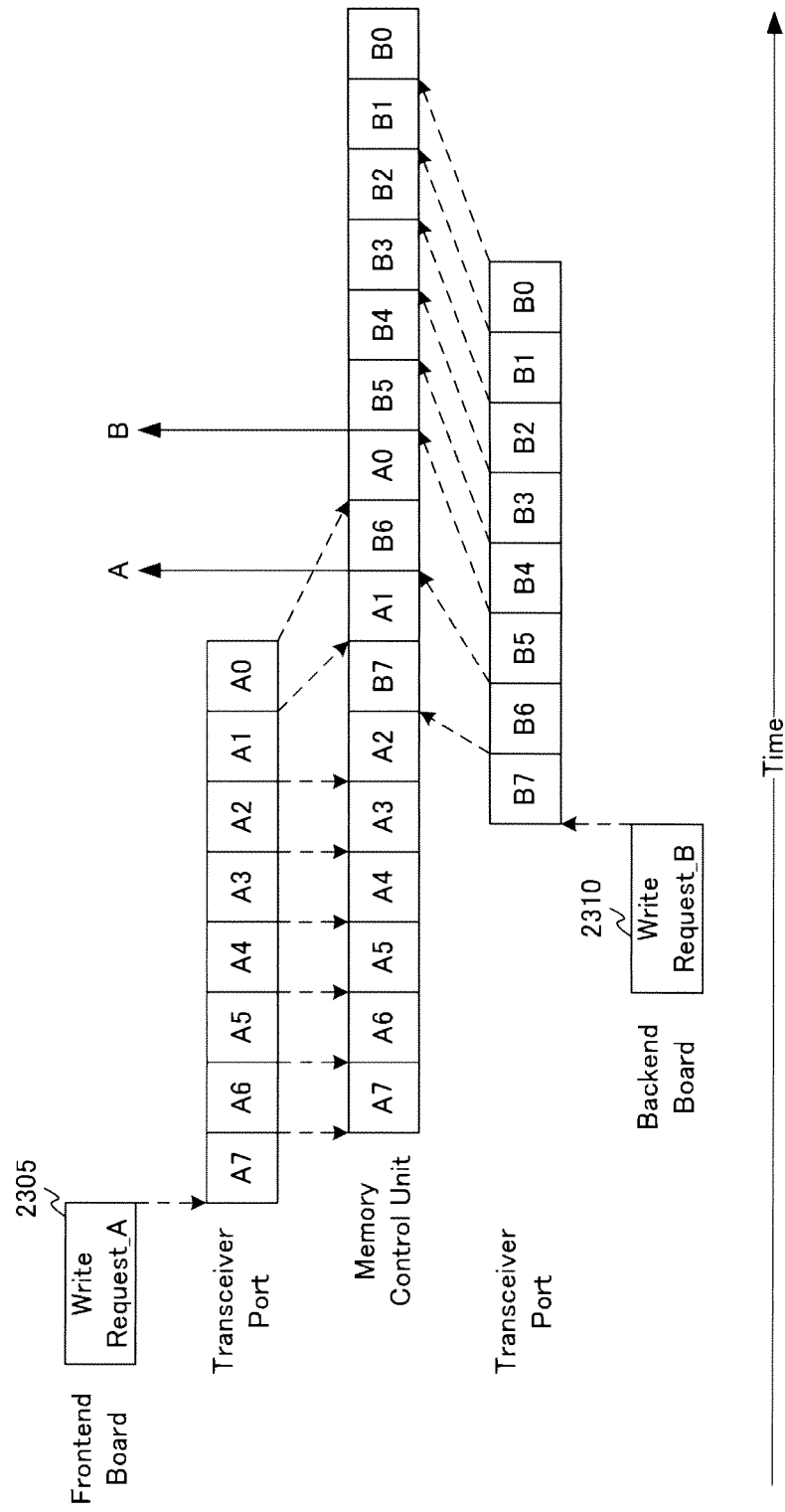
FIG. 23 is a view showing the flow of the process in the memory control unit when the write request from the host computer received by the storage controller competes with other requests according to the first embodiment of the present invention.

FIG. 23 is a view showing the sequence chart illustrated in FIG. 22 by the flow of the process in the memory control unit 415. At first, the processor transmits a data transfer parameter related to the write request 2305 to the frontend board 116 (not shown). In order to distinguish this request from the write request sent from the backend board 117 described later, for convenience, the write request 2305 from the frontend board 116 is referred to as write request A and the write request 2310 from the backend board 117 is referred to as write request B.

The frontend board 116 generates packets based on the data transfer parameter, and transmits to the memory board 118. This process is controlled via the data transfer control unit 210. The packets transmitted from the frontend board 116 reaches the transceiver port 405 of the memory board 118, passes the internal switch 410 (not shown), and reaches the memory control unit 415. In the sequence chart of FIG. 21, wherein only the write request from the frontend board 116 exists, no competition with packets of other requests exist, so that the write request is ended at timing A of FIG. 23 and the next request can be started.

On the other hand, the processor 610 sends a data transfer parameter regarding the write request 2310 to the backend board 117 (not shown). The backend board 117 generates a packet based on the data transfer parameter, and transmits to the memory board 118. It is assumed that the packet transmitted from the backend board 117 reaches the transceiver port 405 of the memory board 118, passes the internal switch 410 (not shown), and reaches the memory control unit 415 after packet A2 of the write request A.

Since the memory control unit 415 processes the packets in the received order, the packets are processed in the order of A2, B7, A1 and B6. As a result, the write request A ends at timing B of FIG. 23. Compared to the case where the write request A is not competing with the write request B, the process end timing of the request is delayed by two packets (packets B7 and B6).

This difference in timing of timing A and timing B (delay worth two packets) is visible as a difference (delay) in processing time, and as a result, visible as the deterioration of access performance.

Figure 24:
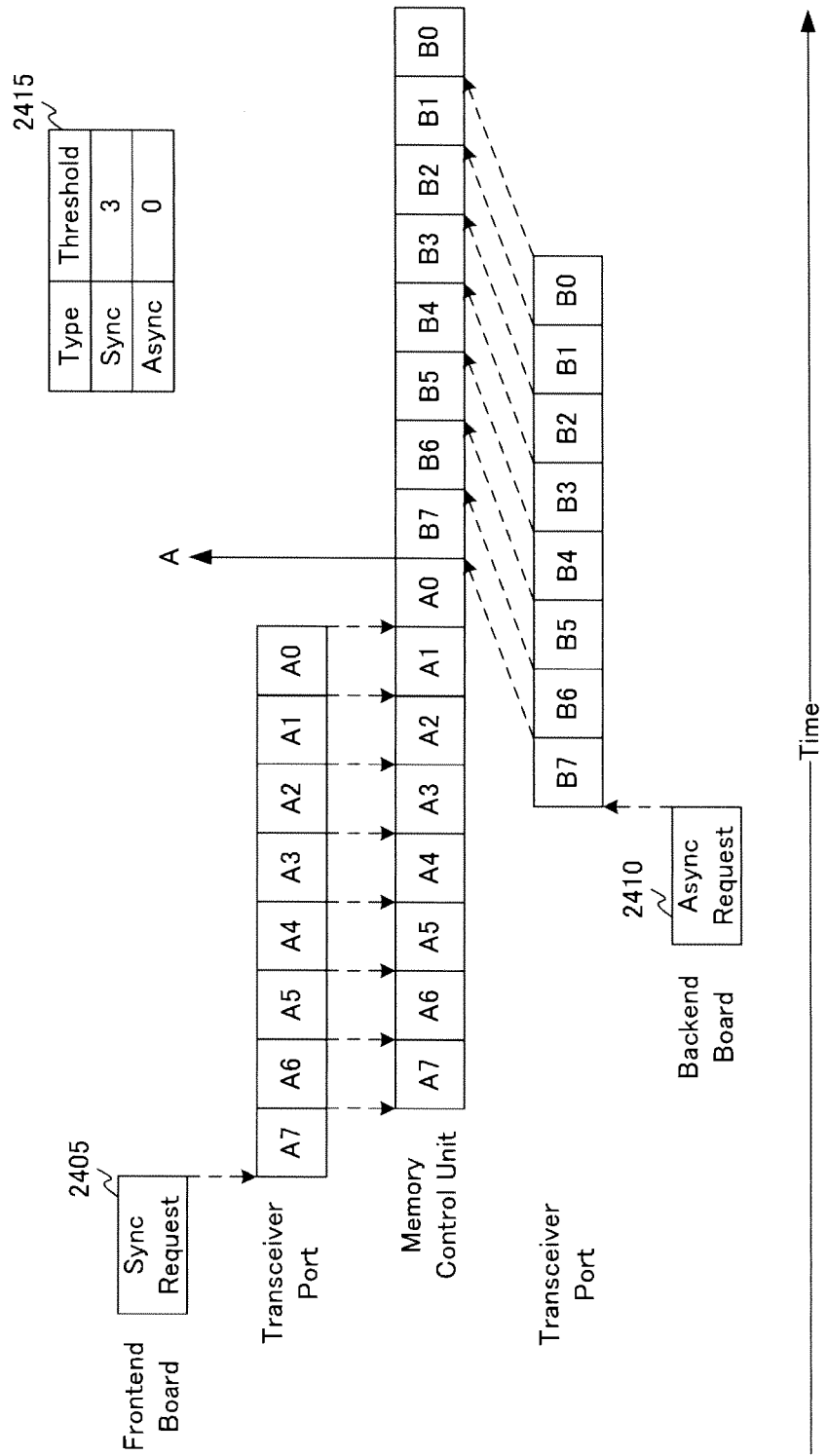
FIG. 24 is a view showing the flow of the process in the memory control unit when the synchronous request and the asynchronous request compete according to the first embodiment of the present invention.

In contrast, the result of having applied the present invention will be shown in FIG. 24. FIG. 24 shows the flow of the process in memory control unit 415 when a synchronous request and an asynchronous request compete after applying the present invention.

In FIG. 24, the write request from the frontend board 116 in FIG. 23 corresponds to a memory write process, so the request is referred to as a synchronous request 2405. Further in FIG. 24, the write request from the backend of FIG. 23 corresponds to a backend write process since the data from the storage device 120 is read when seen from the memory control unit 415. Therefore, the write request from the backend board 117 is referred to as an asynchronous request 2410.

The threshold table that the memory control unit 415 has is in the form of threshold table 1200 of FIG. 12. In FIG. 24, the threshold table is referred to as threshold table 2415 wherein the threshold of a synchronous request is set to 3 and a threshold of an asynchronous request is set to 0, that is, that priority processing via the memory control unit 415 is not applied. The expectation of applying the present invention is that the write request from the frontend board 116 of FIG. 23, that is, the synchronous request 2405, ends at timing A.

According to FIG. 23, the memory unit 415 processes the A2 packet and then processes the B7 packet, but in FIG. 24, the memory control unit 415 having applied the priority processing according to the present invention processes the A2 packet and then processes A1 and A0 packets. Thereby, the synchronous request can be ended at timing A. Then, the frontend board 116 (actually the DMA engine 220) can start the next request.

At this time, the processing of the asynchronous request 2410 is postponed by applying the priority processing of the present invention, but the end timing of the asynchronous request is not influenced thereby. This is recognizable from comparison with the process end timing of write request B of FIG. 23. That is, according to the priority processing of the present invention, the processing time of other requests are not influenced.

Figure 25:
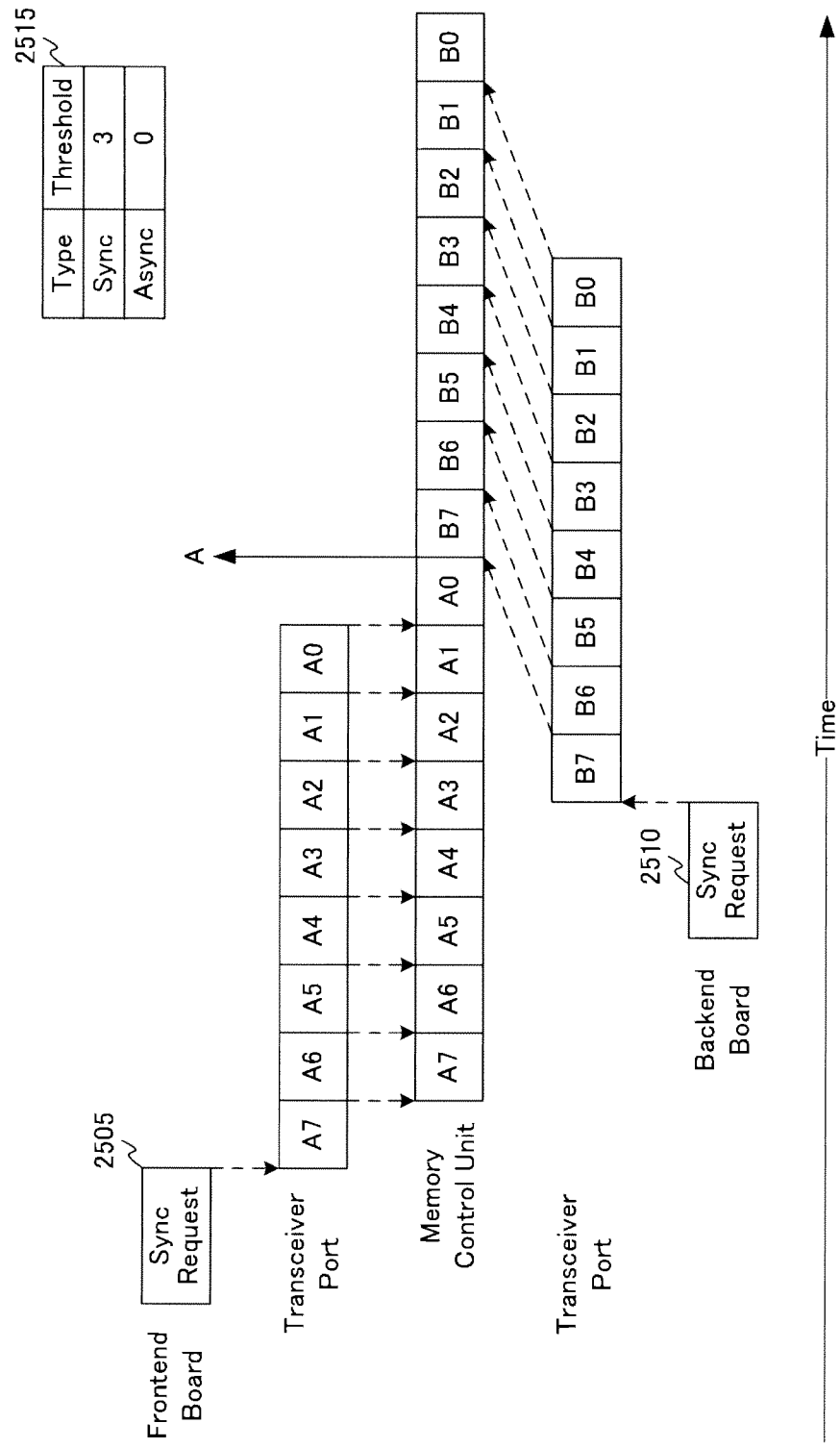
FIG. 25 is a view showing the flow of the process in the memory control unit when synchronous requests compete according to the first embodiment of the present invention.

As another example, a sequence chart in which the present invention is applied when two synchronous requests compete each other will be shown in FIG. 25. In FIG. 25, the threshold of synchronous request is set as 3 and the threshold of asynchronous request is set as 0 in the threshold table 2515. That is, based on the flowchart shown in FIG. 10 (packet receiving process and priority packet notice process), according to the competition of synchronous requests, the request having a smaller remaining packet number becomes the target of priority processing.

At first, the processor 610 sends a data transfer parameter regarding the synchronous request 2505 to the frontend board 116 (not shown).

The frontend board 116 generates a packet based on the data transfer parameter, and sends to the memory board 118. This process is controlled by the data transfer control unit 210. The packet having been transmitted from the frontend board 116 reaching the transceiver port 405 of the memory board 118 passes through the internal switch 410 and reaches the memory control unit 415 (not shown).

On the other hand, the processor 610 transmits a data transfer parameter regarding the synchronous request 2510 to the backend board 117 (not shown).

The backend board 117 generates a packet based on the data transfer parameter, and sends to the memory board 118. It is assumed that the packet transmitted from the backend board 117 having reached the transceiver port 405 of the memory board 118 passes the internal switch 410, and reaches the memory control unit 415 after packet A2 of the synchronous request 2505 (not shown).

Then, the memory control unit 415 specifies the packet of the request to be subjected to priority processing based on the flowchart of FIG. 10 (packet receiving process and priority packet notice process). At first, the memory control unit 415 recognizes that the requests are both synchronous requests based on the request type, so the unit compares the number of remaining packets, which is the next basis of determination.

According to the threshold table 2515, the threshold of the synchronous request is 3. Therefore, the remaining packet number of the two requests are; 2 for synchronous request 2505, and 7 for synchronous request 2410. Therefore, the memory control unit 415 determines a synchronous request 2505 having a remaining number of packets equal to or smaller than the threshold of the synchronous request as the priority target.

The memory control unit 415 processes the A2 packet, and then processes the A1 and A0 packets sequentially. Thereafter, the memory control unit 415 processes the packet of the synchronous request 2510.

Thereby, the synchronous request 2505 can end the process at timing A shown in FIG. 25. Then, the frontend board (actually the DMA engine 220) 116 can start the next request.

Figure 26:
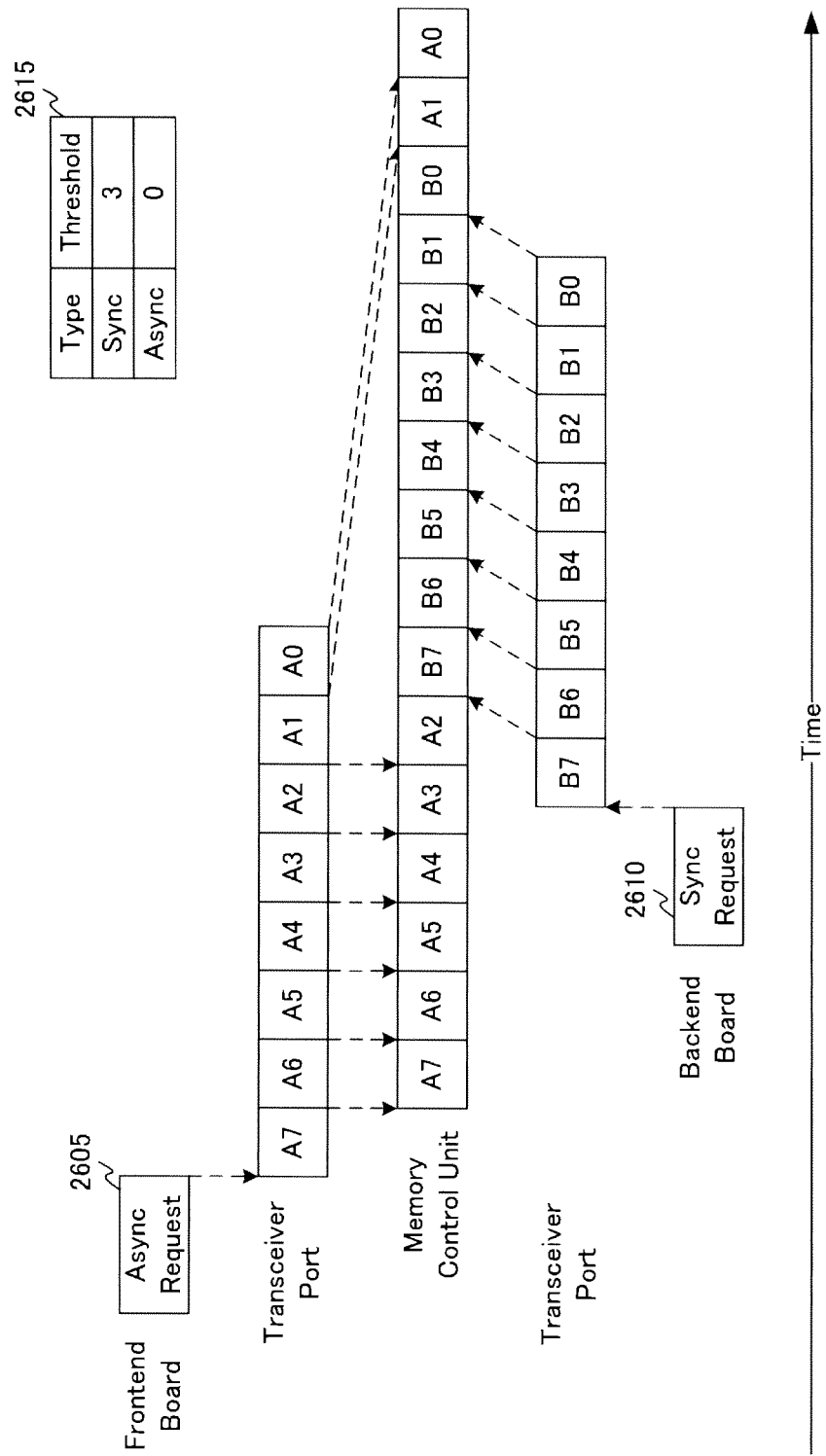
FIG. 26 is a view showing the flow of the process in the memory control unit when an asynchronous request competes with a synchronous request according to the first embodiment of the present invention.

As a yet another example, the sequence chart to which the present invention is applied when an asynchronous request and a synchronous request compete one another is shown in FIG. 26. In FIG. 26, the threshold of the synchronous request is set to 3 and the threshold of the asynchronous request is set to 0 in the threshold table 2615.

At first, the processor 610 sends a data transfer parameter regarding the asynchronous request 2605 to the frontend board 116 (not shown).

The frontend board 116 generates a packet based on the data transfer parameter, and transmits to the memory board 118. This process is controlled via the data transfer control unit 210. The packet transmitted from the frontend board 116 having reached the transceiver port 405 of the memory board 118 passes through the internal switch 410 and reaches the memory control unit 415 (not shown).

On the other hand, the processor 610 transmits the data transfer parameter regarding the synchronous request 2610 to the backend board 117 (not shown).

The backend board 117 generates a packet based on the data transfer parameter, and transmits to the memory board 118. It is assumed that the packet transmitted from the backend board 117 having reached the transceiver port 405 of the memory board 118 passes through the internal switch 410 and reaches the memory control unit 415 after the packet A2 of the asynchronous request 2605 (not shown).

Then, based on the flowchart of FIG. 10 (packet receiving process and priority packet notice process), the memory control unit 415 specifies the packet of the request to be subjected to priority processing. At first, the memory control unit 415 determines based on the request type that the synchronous request 2610 in which the packet was received later is the priority target. This is because the synchronous request 2610 is a request having direct influence on the performance of the device. In this case, the request to be subjected to prioritized process can be specified without referring to the threshold table 2615.

The memory control unit 415 temporarily suspends the processing of the asynchronous request 2605 performed in advance and starts the processing of the synchronous request 2610.

Actually, after processing the A2 packet of the asynchronous request 2605, the memory control unit 415 processes the B7 and B6 packets of the synchronous request 2610, and then processes the B0 packet. Then, the memory control unit 415 processes the A1 and A0 packets of the asynchronous request 2605 which has been temporarily suspended.

Thus, the synchronous request 2610 can end the processes in a minimum time without being influenced by the asynchronous request 2605. Thereafter, the backend board 117 (actually the DMA engine 220) can start the next request.

According to the example described earlier, the request type and the remaining number of transmission packets were used as the basis of determining the priority processing in a memory control unit. The following is a description of an example in which priority processing is performed by further utilizing the information that "subsequent request relates to another target".

Figure 27:
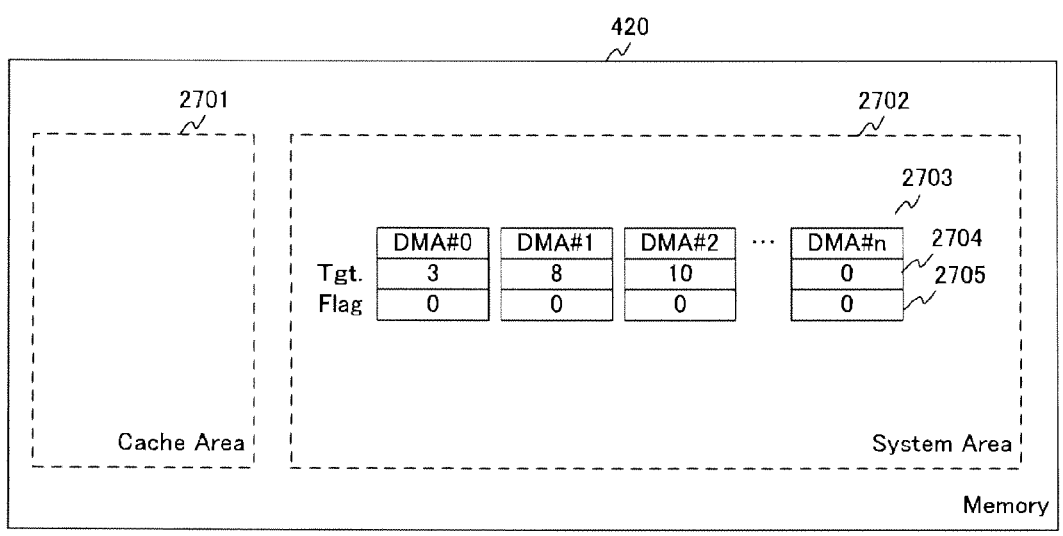
FIG. 27 is a view showing a configuration of a memory area in an other target flag add process in the processor according to the first embodiment of the present invention.

FIG. 27 shows a configuration example of a memory area in an other target flag add process via a processor. Actually, the process is an other target flag add process via a control program operating in the processor 610.

A cache memory area 2701 is an area for temporarily storing the transmission/reception data regarding the host computer 105 and the transmission/reception data regarding the storage device.

A system area 2702 stores the control data, the configuration information, the directory data and the like (not shown) of the storage system.

Regarding the cache memory area 2701 and the system area 2702 in the memory 420 of the memory board 118, the system area 2702 is provided with an area 2703 for storing the target 2704 and flag 2705 of all the DMA engines existing within the storage controller.

The target 2704 relates to a target for transferring data via the DMA engine. For example, it shows that the target of DMA#0 of FIG. 27 transfers data to target number 3. Similarly, DMA#1 transfers data to target number 8, DMA#2 transfers data to target number 10, and DMA#n transfers data to target number 0.

Flag 2705 is a flag indicating that the target 2704 is being referred to or being updated. The flag 2705 is an area shared among multiple processors, and is used to perform exclusive processing. When the flag 2705 is set to 0, it means that no other processor is referring to or updating the target. When the flag 2705 is set to 1, it means that another processor is referring to or updating the target, so that the processor cannot refer to or update the target during that time.

Prior to performing data transfer, the processor 610 first refers to the target 2704 and the flag 2705 corresponding to the DMA engine for performing data transfer, and confirms the target of data transfer performed currently by the relevant DMA engine.

The processor 610 can determine by checking the target of the currently performed data transfer whether the target is same or different as the target of data transfer performed next by the relevant DMA engine. In other words, the processor can determine whether to add an other target flag or not.

Figure 28:
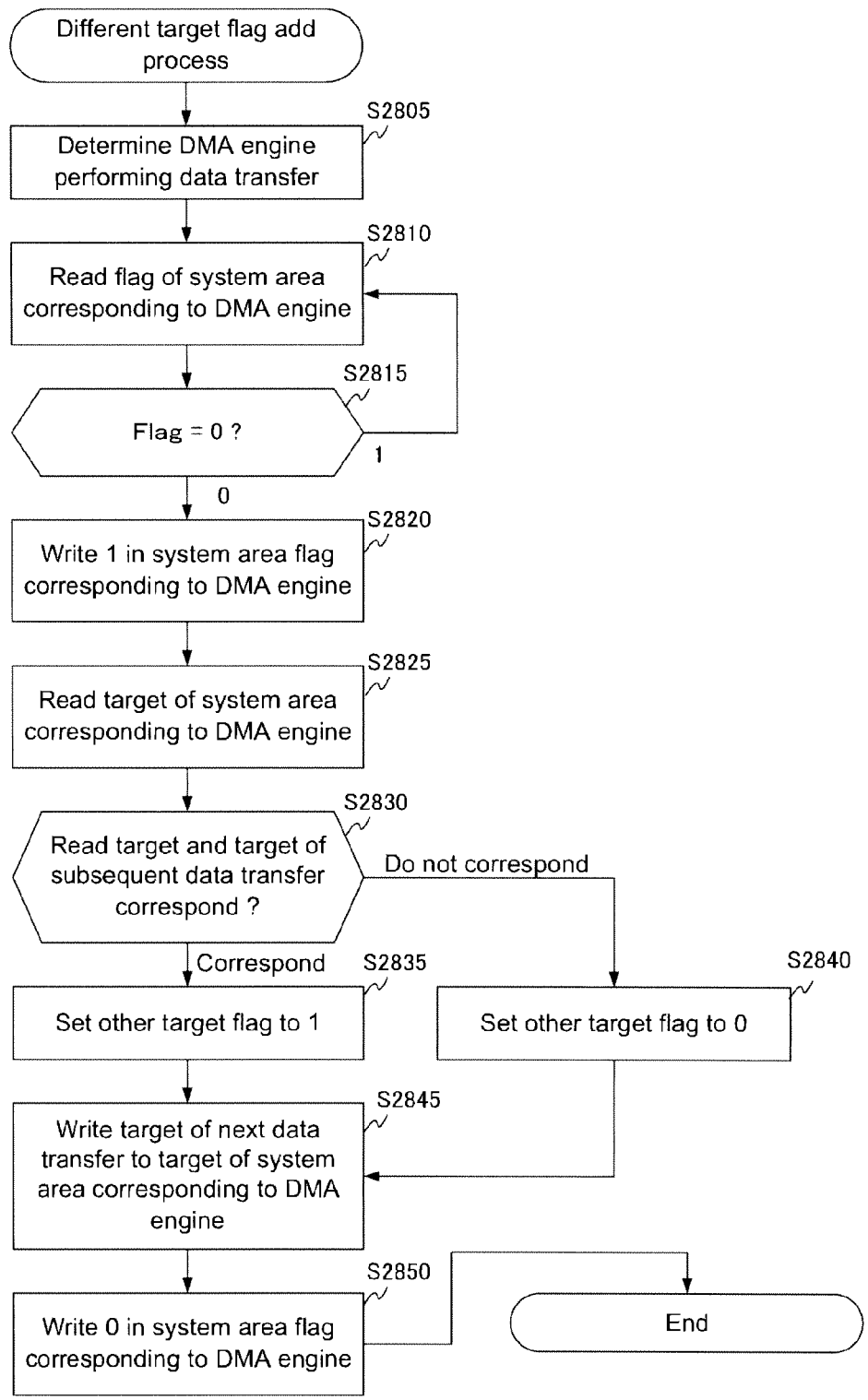
FIG. 28 is a flowchart of an other target flag add process in the processor according to the first embodiment of the present invention.

FIG. 28 is a flowchart of the other target flag add process by the processor. This flowchart is performed by the processor 610.

At first, the processor 610 determines the DMA engine 220 for performing data transfer (S2805). Although not shown, the data transfer target is also determined.

The processor 610 reads a flag 2705 of the system area 2702 corresponding to the DMA engine 220 determined in step S2805 (S2810).

If the flag 2705 read in step S2810 is 0, the processor 610 advances to step S2820, and if not, the processor returns to step S2810 (S2815).

In step S2820, the processor 610 writes 1 in flag 2705 corresponding to DMA engine 220 determined in step S2805 (S2820). Based on step S2820, the other processors cannot update the relevant area.

The processor 610 reads the target corresponding to DMA engine 220 determined in step S2805 from the system area 2702 (S2825). Then, the processor 610 determines whether the target read in step S2825 corresponds to the target of the next data transfer (S2830).

As a result of step S2830, if the targets correspond, the processor 610 sets the other target flag 715 of the data transfer parameter related to the next data transfer to 1 (S2835). As a result of step S2830, if the targets do not correspond, the processor 610 sets the other target flag 715 of the data transfer parameter related to the next data transfer to 0 (S2840).

The processor 610 writes the target of data transfer performed next to the target corresponding to the DMA engine 220 determined in step S2805 (S2845).

Lastly, the processor 610 writes 0 in the flag 2705 corresponding to the DMA engine 220 determined in step S2805 (S2850), and ends the other target flag add process.

Now, since the target 2704 and the flag 2705 of the system area is an area shared among multiple processors, it is preferable to perform writing and reading of data thereto via an exclusive control command so as to prevent logical inconsistency.

Figure 29:
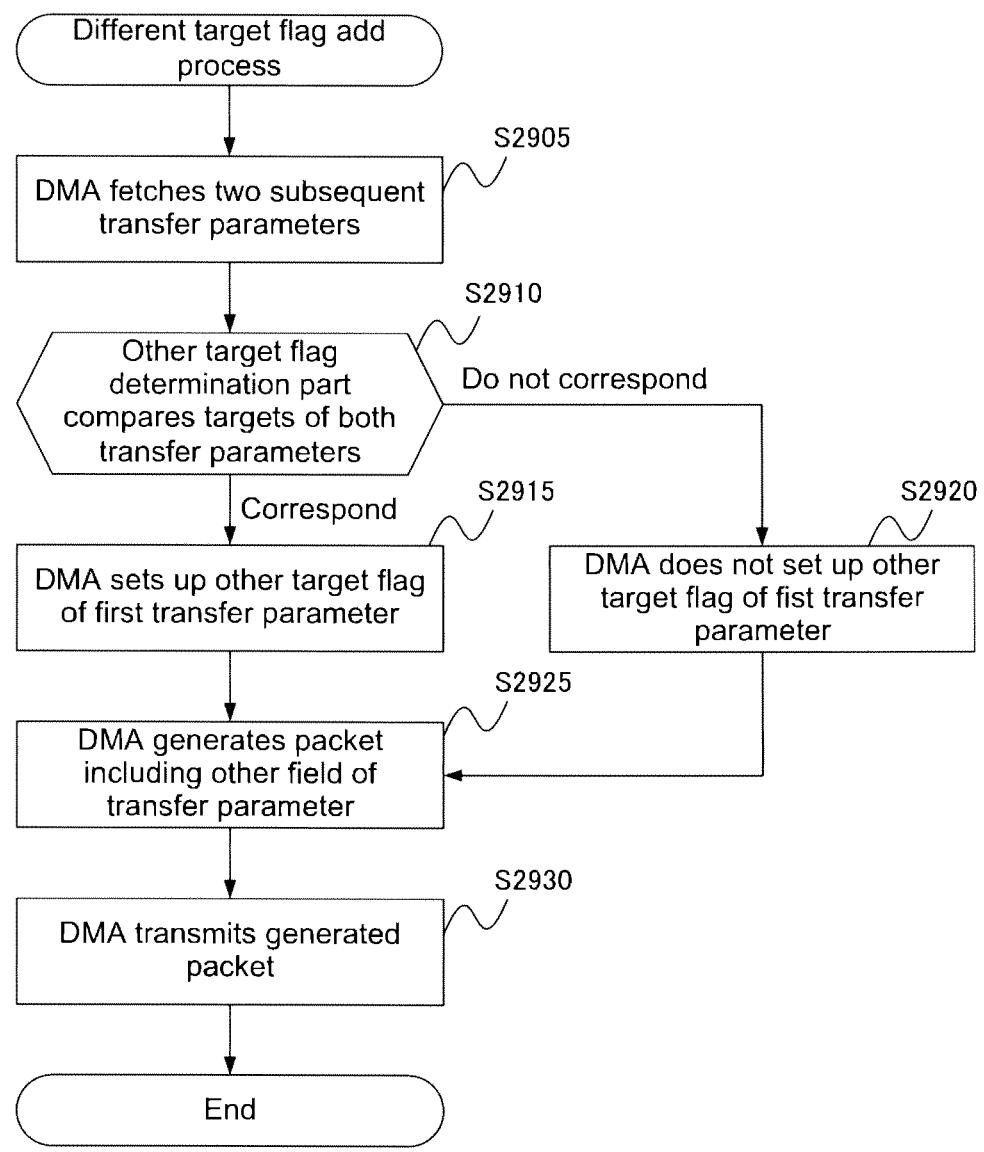
FIG. 29 is a flowchart of an other target flag add process according to the first embodiment of the present invention.

FIG. 29 is a flowchart showing an other target flag add process according to the data transfer control unit 210. The other target flag add step in the flowchart of FIG. 8 has been capable of recognizing whether the next request relates to an other target or not based on the data transfer parameter. The present embodiment enables to determine the same by the data transfer control unit 210 of the frontend board 116 or the backend board 117.

At first, the DMA engine 220 reads from the buffer memory 215 storing the data transfer parameter the data transfer parameter to be processed next and the data transfer parameter to be processed subsequently by itself (S2905). Next, the other target flag additional part 235 compares the targets of the two data transfer parameters (S2910).

According to the method of comparison of the other target flag additional part 235, for example, since the locations showing the targets in the data transfer parameters are the same, it is necessary to merely acquire a logical product of the bit strings of the locations. As a result of acquiring the logical product via the other target flag additional part 235, if all the bits are set to 1, the targets of both data transfer parameters are the same, but even if even one bit is set to 0, the targets become different targets.

If the targets correspond as a result of comparing the two data transfer parameter targets by the other target flag additional part 235, the other target flag 715 is set to 1 (S2915), and if they do not correspond, the other target flag 715 is set to 0 (S2920).

Then, the DMA engine 220 generates fields including the other fields of the packet transmitted to the memory board 118 (S2925) and the packet is transmitted (S2930).

Figure 30:
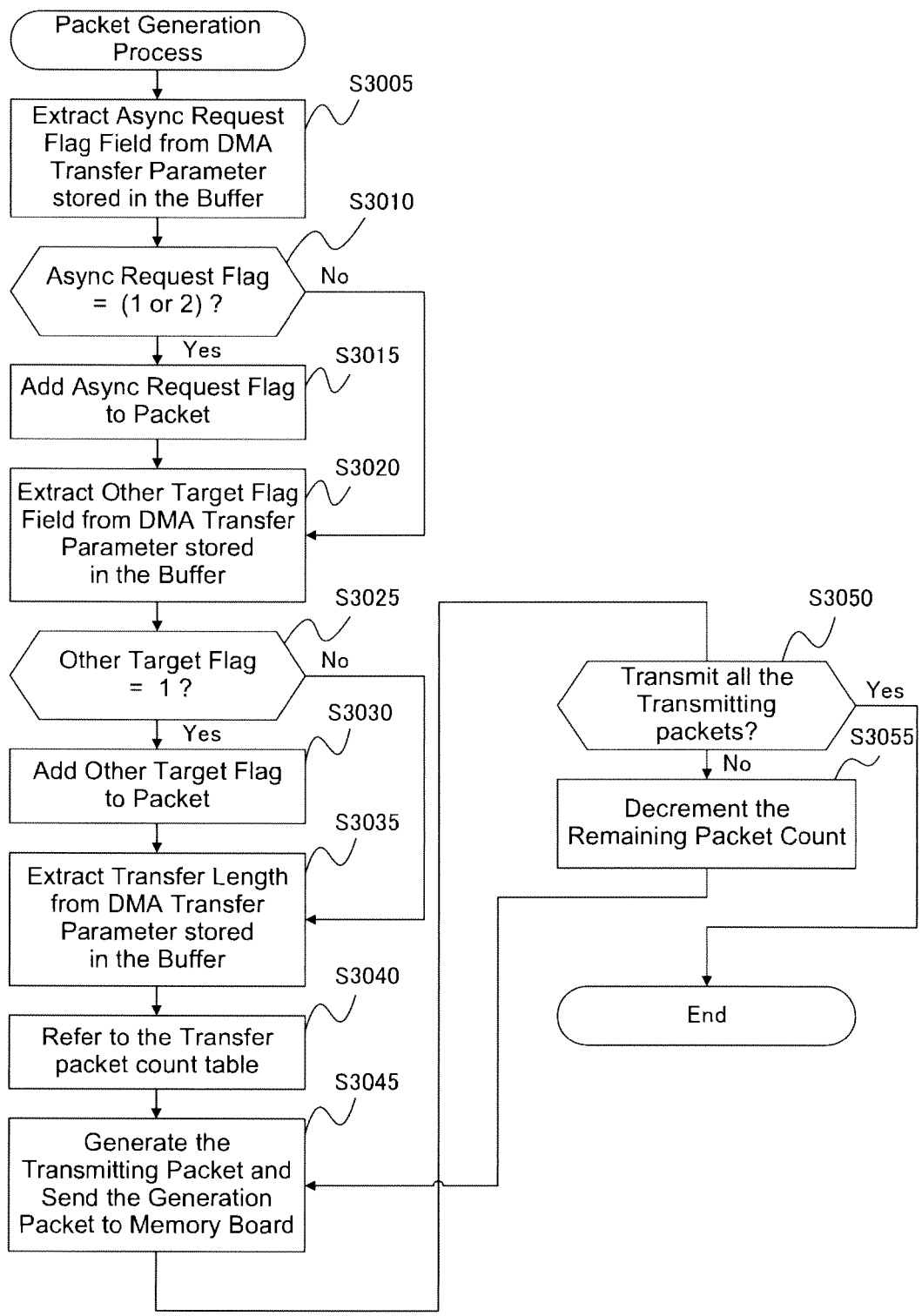
FIG. 30 is a flowchart of a packet generation process according to the first embodiment of the present invention.

FIG. 30 is a flowchart of a packet generation process according to the first embodiment of the present invention. The packet generation process of the packet transmitted from the frontend board 116 to the memory board 118 will be described with reference to FIG. 30. The packet generation process is performed by the data transfer control unit 210 of the frontend board 116. Compared to the packet generation process shown in FIG. 8, the process related to the other target flag 715 is added according to the present example.

The processor 610 transfers the data transfer parameter related to data transfer to be processed by the DMA engine 220 via the data transfer control unit 210 to the buffer memory 215. The packet generation process is started when the data transfer parameter is stored in the buffer memory 215.

At first, the asynchronous request flag additional part 225 of the data transfer control unit 210 extracts the asynchronous request flag from the data transfer parameter received from the processor (S3005). Next, the asynchronous request flag additional part 225 determines whether data transfer performed via the data transfer parameter is an asynchronous request or not (S3010). Actually, the asynchronous request flag additional part 225 checks whether the asynchronous request flag is 1 or 2.

The asynchronous request flag additional part 225 determines that the request is an asynchronous request when the asynchronous request flag is 1 or 2, and orders the DMA engine 220 performing data transfer to set up the asynchronous request flag 910 to the packet (S3015).

Next, the remaining packet count additional part 230 extracts the transfer data length from the data transfer parameter received from the processor 610 (S3020). Then, the remaining packet count additional part 230 refers to the transmitting packet count table 900 and acquires a transmitting packet count 910 corresponding to the transfer data length (S3025). The remaining packet count additional part 230 notifies the acquired transmitting packet count to the DMA engine 220.

Thereafter, the other target flag additional part 235 extracts an other target flag 715 from the data transfer parameter received from the processor 610 (S3030). Then, the other target flag additional part 235 determines whether the target of the next data transfer is of a different target. Actually, whether the other target flag 715 is 1 or not is checked (S3035).

If the other target flag 715 is 1, the other target flag additional part 235 determines that the next data transfer is performed to another target, and orders the DMA engine 220 performing data transfer to add an other target flag 715 to the packet (S3040).

The DMA engine 220 extracts necessary information for constituting a packet from the data transfer parameter including the asynchronous request flag 710, the remaining packet transmission count 720 and the other target flag 715, and constructs the packet to be transmitted. Then, the DMA engine 220 sends the constructed packet to the memory board 118 (S3045).

The DMA engine 220 determines whether all the packets to be transmitted have been transmitted (S3050). If the packets to be transmitted have all been transmitted, the DMA engine 220 ends the process, but if there still remains a packet to be transmitted, the engine decrements the remaining packet transmission count (S3055) and returns to step S3045.

Figure 31:
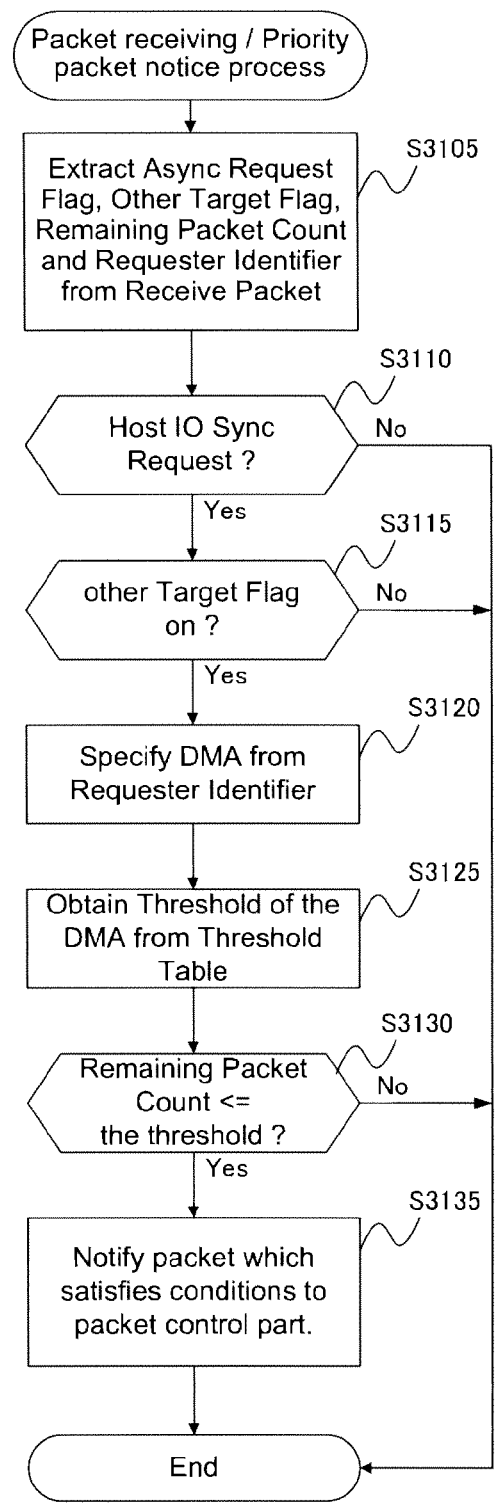
FIG. 31 is a flowchart of a packet receiving process and a priority packet notice process according to the first embodiment of the present invention.

FIG. 31 is a flowchart of a packet receiving process and a priority packet notice process according to the first embodiment of the present invention. Next, the packet receiving process and the priority packet notice process will be described with reference to FIG. 31. The packet receiving process and the priority packet notice process will be performed by the memory control unit 415. The packet receiving process will be started when a packet is received from a frontend board 116 or the like to the memory control unit 415. The present process differs from the packet receiving process and the priority packet notice process of FIG. 10 in that a process regarding the other target flag 715 is added.

At first, the packet analysis unit 510 decodes the packet received from the frontend board 116 and the like, and extracts the asynchronous request flag 710, the remaining packet transmission count 720, the other target flag 715 and the requester identifier 725 (S3105). The packet analysis unit 510 determines which packet (request) is to be prioritized based on these information.

At first, the packet analysis unit 510 determines whether the request is a synchronous request or not (S3110). It is determined at first whether the request is a synchronous request since it directly affects the storage system performance. If the request is not a synchronous request, but an asynchronous request, the packet analysis unit 510 ends the packet receiving process and the priority packet notice process. What is meant by ending the process is that the received packets are processed normally, that is, in the received order, by the memory access unit 535.

When the request is determined as a synchronous request, the packet analysis unit 510 then determines whether the other target flag 715 is 1 or not (S3115). If as a result of step S3115 the other target flag 715 is determined to be 1, the packet analysis unit 510 advances to step S3120, and if the flag is 0, the unit ends the packet receiving process and the priority packet notice process.

Thereafter, the packet analysis unit 510 determines whether the remaining packet transmission count 720 is equal to or below a threshold or not. At first, the packet analysis unit 510 refers to the threshold table. If the threshold table is set up for each DMA engine, that is, if the threshold table 1400 as shown in FIG. 14 is used, the threshold corresponding to the requester identifier 725 acquired via step S3105 is acquired (S3120).

If the threshold table is set up for each request type, that is, if a threshold table 1200 as shown in FIG. 12 is used, the threshold defined as the synchronous request is acquired (S3125). It is assumed hereafter that a threshold table is set up for each request type, but a similar process can be adopted if the threshold table is set up for each DMA engine.

Next, the packet analysis unit 510 compares the acquired threshold with the remaining packet transmission count 720 included in the received packet, and determines whether the remaining packet transmission count 720 is equal to or smaller than the threshold (S3130). If the remaining packet transmission count 720 is equal to or smaller than the threshold, the packet analysis unit 510 determines that the packet (request) is to be subjected to priority processing by the memory access unit 535. If not, the packet analysis unit 510 ends the packet receiving process and the priority packet notice process.

The packet analysis unit 510 notifies the packet determined as a packet to be subjected to priority processing to the buffer control unit 520 (S3135), and ends the packet receiving process and the priority packet notice process.

The information notified by the packet analysis unit 510 to the buffer control unit 520 includes the storage location (such as n-th step) in the internal buffer in which the memory control unit 415 temporarily stores the received packet, or the information capable of specifying the packet to be subjected to priority processing. The information capable of specifying the packet to be subjected to priority processing can be, for example, a requester identifier, an address within the access destination, a unique identifier within the storage controller 115 added to the data transfer request, or a combination thereof.

The information capable of specifying the packet to be subjected to priority processing is stored within the internal resistor or the like within the memory control unit 415, and as a result of acquiring the logical product of these information of the packets stored in the internal buffer, the packet having all bits set to 1 can be specified as the packet to be subjected to priority processing. Further, as long as the information is capable of specifying the packet to be subjected to priority processing, the information can be other than those described above.

The target of the packets to be subjected to priority processing determined by the packet analysis unit can be of one type or of multiple types. However, if the target packets to be subjected to priority processing is increased too much, as a result, the process will not be much different from when priority processing is not performed, so the target packets should be of a few types.

According to the first embodiment, the processing performance of the storage system can be enhanced without influencing the processing time of the other requests by having the memory control unit 415 prioritize the processing of a request directly influencing the system performance and having a smaller remaining packet transmission count in the data transfer processing related to the request than the other requests.

Embodiment 2

Figure 32:
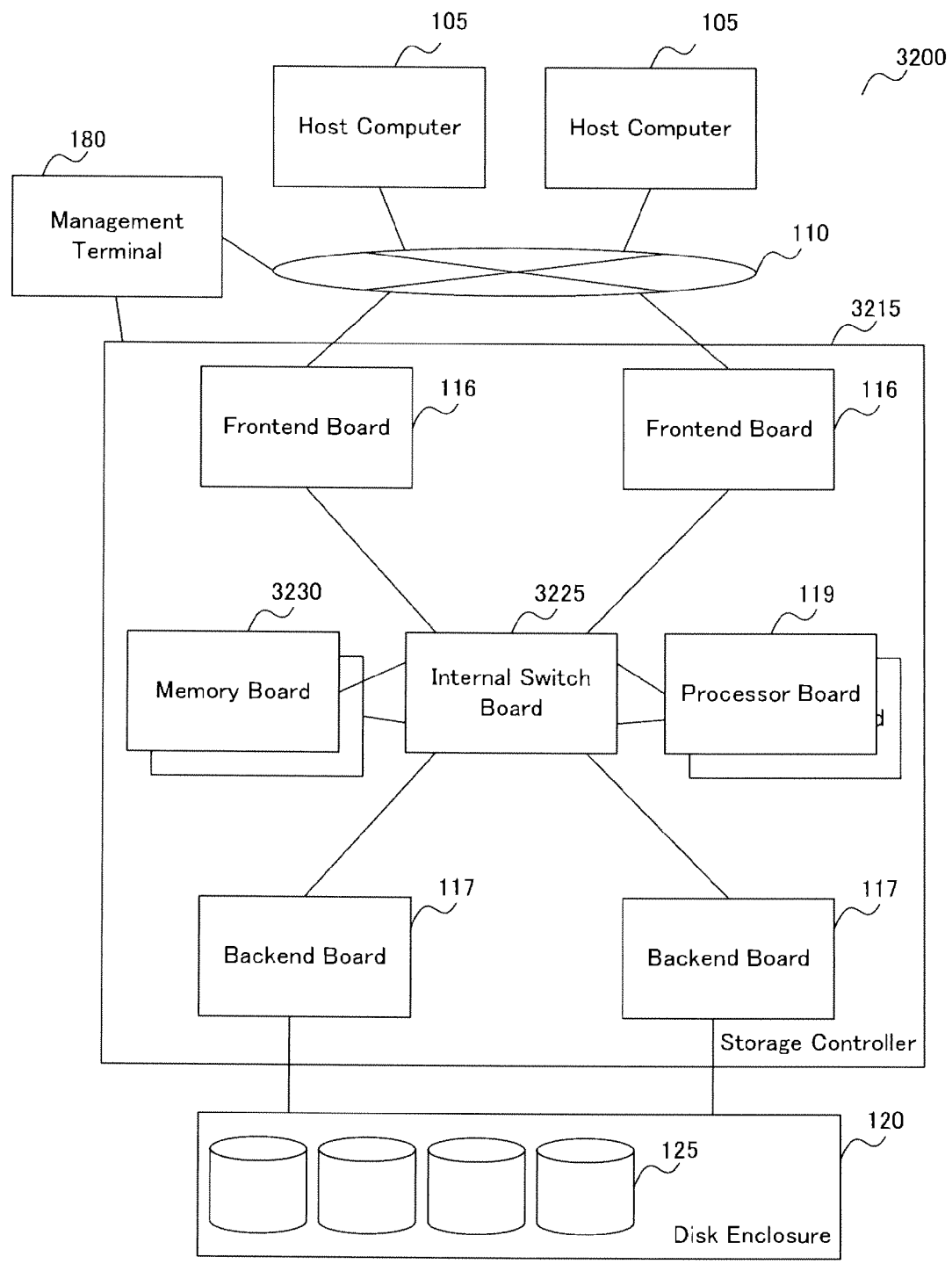
FIG. 32 is a block diagram showing a configuration of a computer system according to a second embodiment of the present invention.

FIG. 32 is a view showing the configuration of a storage system according to a second embodiment. In the configuration of a storage system 3200 according to embodiment 2, the configuration of a storage controller 3215 differs from the storage controller 115 of FIG. 1 according to the first embodiment, but the other arrangements are the same as the storage system according to embodiment 1. The configuration and processing of the second embodiment equivalent to the first embodiment are provided with the same reference numbers and the detailed descriptions thereof are omitted.

The configuration of the storage system according to the second embodiment will be described with reference to FIG. 32. Similar to the first embodiment, the storage system 3200 comprises a host computer 105, a storage controller 3215 and a storage device 120.

The storage controller 115 according to the first embodiment has the frontend board 116, the backend board 117 and the processor board 119 directly coupled to the memory board 118.

In contrast, the storage controller 3215 according to the second embodiment has the frontend board 116, the backend board 117, the processor board 119 and a memory board 3230 mutually coupled via an internal switch board 3225.

Figure 33:
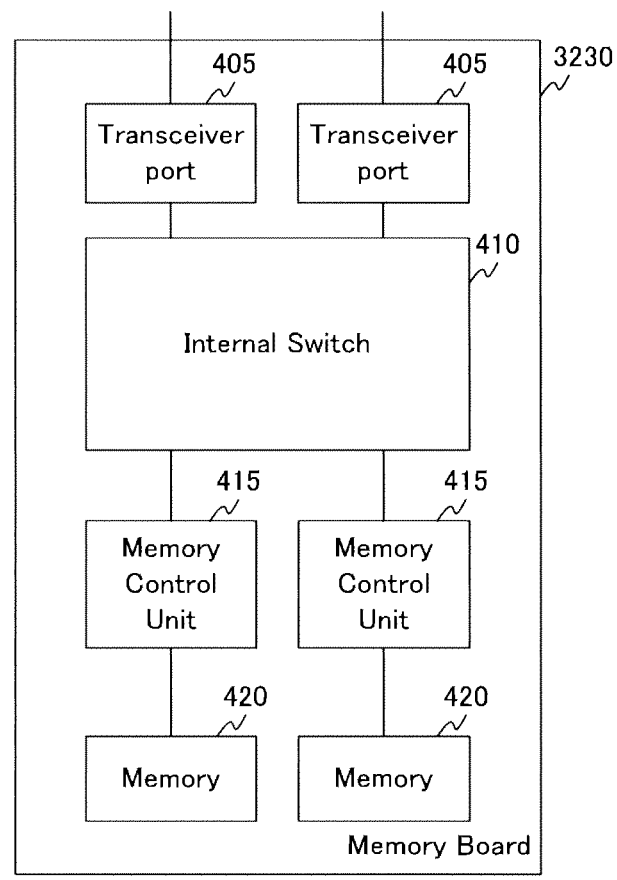
FIG. 33 is a block diagram showing a configuration of a memory board according to a second embodiment of the present invention.

FIG. 33 is a block diagram showing a configuration of a memory board according to the second embodiment of the present invention. The configuration of the memory board 3230 is similar to the memory board 118 of FIG. 4. The difference between the memory boards is that in the memory board 3230, the transceiver port 405 for coupling with the frontend board 116 and the backend board 117 does not exist.

The internal switch board 3225 couples the respective units of the storage controller 3215 (the frontend board 116, the backend board 117, the memory board 3230 and the processor board 119), and relays the communication of the respective units.

The frontend board 116, the backend board 117 and the processor board 119 are similar to the first embodiment, so the description thereof is omitted. Since the frontend board 116, the backend board 117 and the memory board 3230 according to the second embodiment is similar to those of the first embodiment, the technique disclosed in the first embodiment can be applied to the second embodiment.

According to the second embodiment of the present invention, the storage controller 3215 can have the memory control unit 415 prioritize the processing of the command that directly influences the system performance and that has a smaller remaining packet transmission count in the data transfer process of the relevant command than the other commands. Thereby, the processing performance of the storage controller 3215 and the whole storage system 3200 can be enhanced without influencing the processing time of other commands.

Embodiment 3

Figure 34:
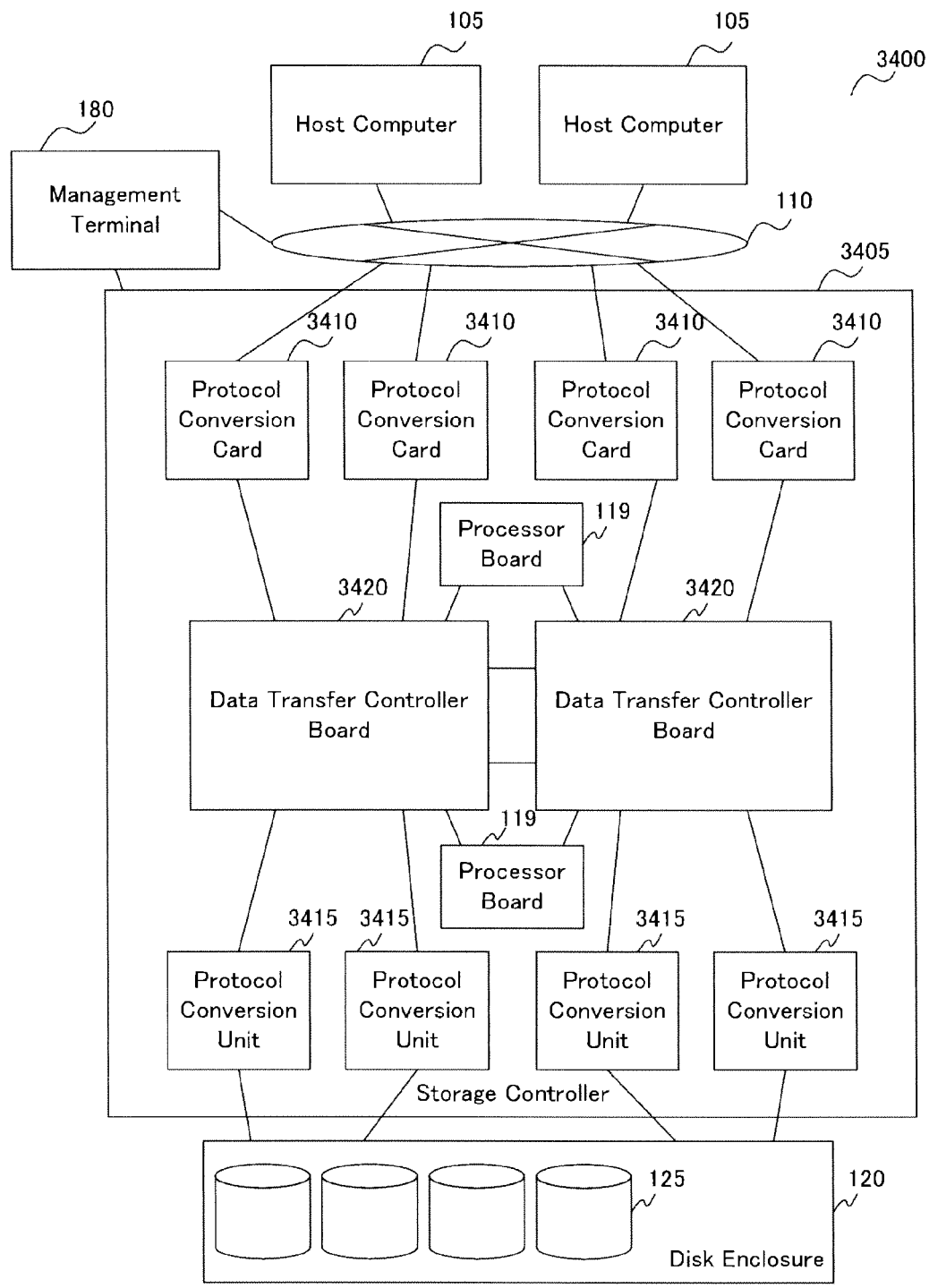
FIG. 34 is a block diagram showing the configuration of a computer system according to a third embodiment of the present invention.

FIG. 34 is a view showing the configuration of a storage system according to the third embodiment. The configuration of the storage system 3400 according to the third embodiment is similar to the storage system of the first embodiment, except that the configuration of the storage controller 3405 differs from that of the storage controller 115 of FIG. 1 according to the first embodiment. The configurations and processes according to embodiment 3 equivalent to those of embodiment 1 are provided with the same reference numbers, and detailed descriptions thereof are omitted.

The configuration of the storage controller 3405 according to the third embodiment will be described with reference to FIG. 34. The storage system 3400 includes a host computer 105, a storage controller 3405 and a storage device 120 similar to the first embodiment.

According to the storage controller 115 of the first embodiment, the frontend board 116, the backend board 117 and the processor board 119 were directly coupled to the memory board 118.

In contrast, according to the storage controller 3405 of the third embodiment, a frontend protocol conversion card 3410, a backend protocol conversion card 3415 and a processor board 119 are directly coupled to a data transfer controller board 3420. The details of a storage controller 3405 according to the third embodiment will be described below.

The frontend protocol conversion card 3410 converts protocols used for communication between the host computer 105 and the storage controller 3405 to a protocol used within the storage controller 3405. The frontend protocol conversion card 3410 has a similar function as the frontend protocol conversion unit 205 according to the first embodiment.

The backend protocol conversion card 3415 converts protocols used for the communication between the storage device 120 and the storage controller 3405 to a protocol used within the storage controller 3405. The backend protocol conversion card 3415 has a similar function as the backend protocol conversion unit 305 according to the first embodiment.

Figure 35:
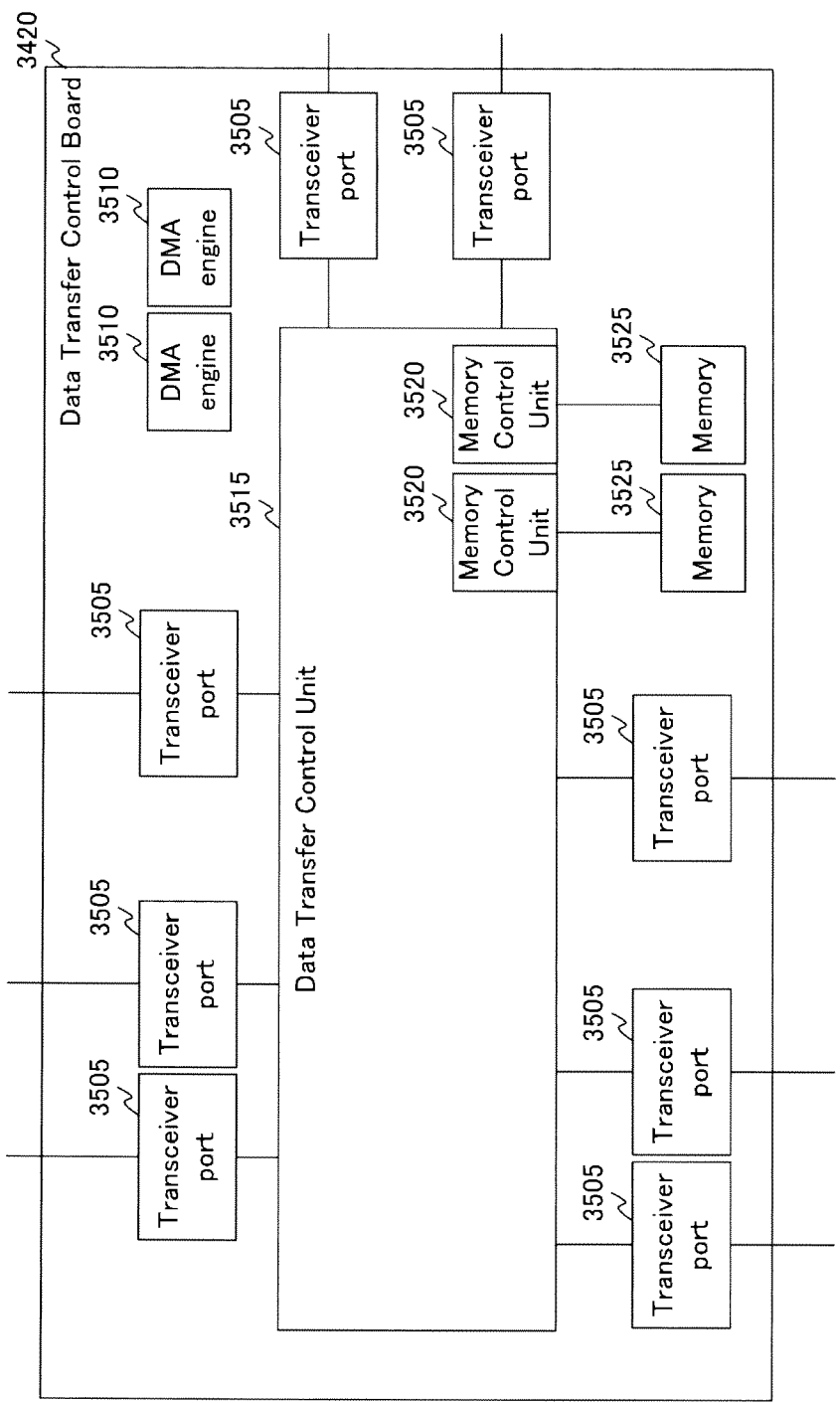
FIG. 35 is a block diagram showing a configuration of a data transfer controller board according to the third embodiment of the present invention.

The data transfer controller board 3420 will be described with reference to FIG. 35. The data transfer controller board 3420 has a function to control data transmission of the data transmitted to or received from the host computer 105 via the frontend protocol conversion card 3410 and the data transmission of the data transmitted to or received from the storage device 120 via the backend protocol conversion card 3415, and the data transmission with the processor board 119.

The data transfer controller board 3420 includes a transceiver port 3505, a DMA engine 3510 and a data transfer control unit 3515. The transceiver port 3505 has a signal processing function corresponding to the physical layer or the data link layer in an OSI reference model.

The DMA engine 3510 mainly performs data transfer between memories. The DMA engine 3510 stores the data stored in a memory 3525 to a predetermined area within a memory 3525 based on the data transfer parameter transferred from the processor 610 on the processor board 119. Further, the DMA engine 3510 reads the data stored in the memory 3525 based on the data transfer parameter, and stores the same in a predetermined area of the memory 3525.

The memory control unit 3520 interprets the packet received from the frontend board 116 or the like, and controls the reading and writing of data on the memory. The configuration of the memory control unit 3520 has a similar configuration as the memory control unit 3520 according to the first embodiment, so the detailed description thereof are omitted.

According to the third embodiment of the present invention, the storage controller 3405 can have the memory control unit 3520 process the command that directly influences the system performance and having a small remaining packet transmission count in the data transfer process thereof with higher priority than the other commands. Thereby, the processing performance of the storage controller 3405 and the whole storage system 3400 can be improved without influencing the processing time of other commands.

The present invention is not restricted to the above-described embodiments, and other various modified examples are included in the scope of the invention. For example, according to the above-described embodiment, the technique disclosed in the present invention is applied when competition occurs while accessing the memory board, but the present invention is not restricted thereto. For example, the technique disclosed in the present invention can also be applied to the competition that occurs in accessing the buffer memory on the frontend board or the backend board, or to the competition that occurs in the path between the internal switch board 3225 and the respective boards illustrated in FIG. 32.

Further according to the above embodiment, the requester issuing the memory access of the memory board is the DMA engine, but the requester is not restricted thereto. For example, as shown in FIG. 1, a processor board is also coupled to the memory board. A processor is mounted on the processor board. The processor accesses the system area of the memory on the memory board storing the control data, the configuration data and the directory data of the storage system. In other words, the processor may become the requestor issuing the memory access of the memory board.

Although not shown, various controllers such as a power controller, a battery charge controller and a device environment monitor controller are disposed within the storage controller. The present invention can be applied not only to DMA engines and processors but also to the competition between requester (initiator) devices including the above-described controllers.

By focusing on the buffer memory on the frontend board or the backend board, the frontend or backend protocol conversion unit can also act as the requester. If a data read request from a host computer is received, the DMA engine stores the data read from the memory into the buffer memory. If the desired data is not stored in the memory, the desired data is read from the storage device and stored into the memory and the buffer memory. Thereafter, the data stored in the buffer memory must be transmitted to the host computer. In many cases, this process is controlled via the frontend or backend protocol conversion unit.

The above-illustrated embodiments are mere examples for illustrating the present invention in detail, and they are not intended to restrict the present invention to include all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to or deleted from or replaced with other configurations.

Furthermore, a portion or whole of the above-illustrated configurations, functions, processing units, processing means and so on can be realized via a hardware configuration such as by designing an integrated circuit. Further, the configurations and functions illustrated above can be realized via a software by the processor interpreting and executing programs realizing the respective functions.

The information such as the programs, tables and files for realizing the respective functions can be stored in a storage device such as a memory, a hard disk or a SSD (Solid State Drive) or in a memory media such as an IC card, an SD card or a DVD.

Further, only the control lines and information lines considered necessary for description are illustrated in the drawings, and not necessarily all the control lines and information lines required for production are illustrated. In actual application, almost all the configurations are mutually coupled.

INDUSTRIAL APPLICABILITY

The present invention can be applied to information processing apparatuses such as large-scale host computers, general-purpose computers and servers, or to storage devices or storage systems.

REFERENCE SIGNS LIST

100 Storage system
105 Host computer
110 Network (SAN)
115 Storage controller
116 Frontend board
117 Backend board
118 Memory board
119 Processor board
120 Storage device
125 Disk
180 Management terminal
205 Frontend protocol conversion unit
210 Data transfer control unit
215 Buffer memory
220 DMA engine
225 Asynchronous request flag additional part
230 Remaining packet count additional part
235 Other target flag additional part
305 Backend protocol conversion unit
405 Transceiver port
410 Internal switch
415 Memory control unit
420 Memory
505 Buffer
510 Packet analysis unit
515 Threshold table
520 Buffer control unit 525 Priority buffer
530 Selector
535 Memory access unit
605 I/O attachment
610 Processor
615 Local memory
700 Packet
705 Command field
710 Asynchronous request flag field
715 Other target flag field
720 Remaining packet transmission count field
725 Requester identifier field
730 Transmission destination address field
735 Write data field
740 Error detection code field
900 Transmitting packet count table
905 Transfer length
910 Transmitting packet count
1200, 1300, 1400, 1500 Threshold table
1205, 1305, 1410, 1505 Request type
1210, 1310, 1415, 1515 Threshold
1405 Requester identifier
1510 Transfer length
1605, 1610, 1705, 1710 Synchronous request
1615, 1715 Threshold table
1800 Management screen
1805 Normal
1810 High performance mode
1815 "performance prioritized" mode
1820 "request having smaller remaining packet prioritized" mode
2305 Write request A
2310 Write request B
2405, 2505, 2510, 2610 Synchronous request
2410, 2605 Asynchronous request
2415, 2515, 2615 Threshold table
2701 Cache memory area
2702 System area
2703 Area
2704 Target
2705 Flag
3200 Storage system
3215 Storage controller
3225 Internal switch
3230 Memory board
3400 Storage system
3405 Storage controller
3410 Frontend protocol conversion card
3415 Backend protocol conversion card
3420 Data transfer controller board
3505 Transceiver port
3510 DMA engine
3515 Data transfer control unit
3520 Memory control unit
3525 Memory

The invention claimed is:

1. A storage subsystem coupled to a host computer, the storage subsystem comprising:
   a disk device coupled to the host computer, capable of communicating with the host computer and storing data related to a write request from the host computer; and
   a storage controller configured to control the disk device; the storage controller comprising:
   a memory unit configured to store data communicated with the host computer and a control information of the storage controller; and
   a processor unit configured to control the storage controller;
   wherein when a first data transfer access to the memory area of the memory unit is received after a second data transfer access is started and while the second data transfer access is in process, the storage controller is configured to
   determine whether the first data transfer access satisfies one of the following conditions:
   (1) the access is a request synchronized with a host IO; or
   (2) the access has a remaining data transfer quantity equal to or smaller than a predetermined threshold; and
   prioritize the first data transfer access over the second data transfer access when the first data transfer access satisfies the one of the conditions (1) and (2).

2. The storage subsystem according to claim 1, wherein the storage controller comprises a host interface unit configured to communicate with the host computer and a disk interface unit for communicating with the disk device.

3. The storage subsystem according to claim 2, wherein the access, which is a request synchronized with the host IO, is one of the following:
   (1) a data write transfer for writing data from the host interface unit to the memory unit;
   (2) a data read transfer for reading data from the memory unit to the host interface unit; or
   (3) a data write transfer for writing the data stored in the disk device to the memory unit.

4. The storage subsystem according to claim 3, wherein when a third data transfer access executed after completing the first data transfer access is an access to a memory area that differs from said memory area, the storage controller is configured to start the third data transfer access to a memory area that differs from said memory area.

5. The storage subsystem according to claim 3, wherein when a data transfer quantity of the first data transfer access differs from a data transfer quantity of the second data transfer access, the storage controller is configured to select a data transfer access to be performed with priority based on a remaining data transfer quantity.

6. The storage subsystem according to claim 3, further comprising a data transfer management table composed of two or more selected from the group:
   a data transfer access type information, a data transfer quantity type information, a remaining transfer quantity information, and a data transfer access request source information.

7. The storage subsystem according to claim 6, wherein the data transfer access type information is one of the following types:
   a synchronous access, an unconstrained asynchronous access, and a constrained asynchronous access.

8. The storage subsystem according to claim 3, wherein data of the data transfer access include one of the following:
   an asynchronous request flag for discriminating an asynchronous request type, a remaining transfer quantity information showing a data transfer quantity that has not been transmitted, and an other target flag for discriminating a transfer destination.

9. The storage subsystem according to claim 3, further comprising a management terminal coupled to the storage subsystem configured to select a priority processing mode and a normal mode not performing priority processing.

10. The storage subsystem according to claim 2, wherein the memory unit is coupled to the host interface unit, the disk interface unit and the processor unit.

11. The storage subsystem according to claim 2, wherein the storage subsystem further comprises an internal switch unit; and the memory unit, the host interface unit, the disk interface unit and the processor unit are mutually coupled using the internal switch unit.

12. The storage subsystem according to claim 2, wherein the storage subsystem further comprises a data transfer control unit; and the memory unit is coupled using the data transfer control unit to the host interface unit, the disk interface unit and the processor unit.

13. The storage subsystem according to claim 12, wherein a request source of the data transfer access is either the memory unit, the host interface unit, the disk interface unit, or a processor; or a controller of the data transfer control unit or the processor unit.

14. The storage subsystem according to claim 12, wherein the data transfer access destination is a storage means in the memory unit, the host interface unit, the disk interface unit, the processor unit or the data transfer control unit.

15. A data transfer method in a storage subsystem coupled to a host computer, wherein the storage subsystem includes:
a disk device coupled to the host computer, capable of communicating with the host computer and storing data related to a write request from the host computer; and
a storage controller configured to control the disk device comprising:
a host interface unit configured to communicate with the host computer;
a disk interface unit configured to communicate with the disk unit;
a memory unit configured to store data communicated with the host computer and a control information of the storage controller; and
a processor unit configured to control the storage controller, and the data transfer method comprising:
receiving a first data transfer access to the memory area of the memory unit after a second data transfer access is started and while the second data transfer access is in process,
data transfer access to complete a data transfer process when determining whether the first data transfer access satisfies one of the following conditions:
(1) the access is a request synchronized with a host IO; or
(2) the access has a remaining data transfer quantity equal to or smaller than a predetermined threshold; and
prioritizing the first data transfer access over the second data transfer access when the first data transfer access satisfies one of the condition (1) and (2).

16. The data transfer method according to claim 15, wherein the access, which is a request synchronized with the host IO, is one of the following:
(1) a data write transfer for writing data from the host interface unit to the memory unit;
(2) a data read transfer for reading data from the memory unit to the host interface unit; or
(3) a data write transfer for writing the data stored in the disk device to the memory unit.

17. The data transfer method according to claim 16, wherein when a third data transfer access executed after completing the first data transfer access is an access to a memory area that differs from said memory area, the method further comprises starting the third data transfer access to a memory area that differs from said memory area.

18. The data transfer method according to claim 16, wherein when a data transfer quantity of the first data transfer access differs from a data transfer quantity of the second data transfer access, the method further comprises selecting a data transfer access to be performed with priority based on a remaining data transfer quantity.

* * * * *